US012684135B2

(12) United States Patent
Choi et al.

(10) Patent No.: US 12,684,135 B2
(45) Date of Patent: Jul. 14, 2026

(54) CROSS-COMPONENT LINEAR MODEL (CCLM) INTRA PREDICTION-BASED VIDEO ENCODING/DECODING METHOD, APPARATUS, AND RECORDING MEDIUM FOR STORING BITSTREAM

(71) Applicant: LG ELECTRONICS INC., Seoul (KR)

(72) Inventors: Jangwon Choi, Seoul (KR); Jaehyun Lim, Seoul (KR); Sunmi Yoo, Seoul (KR); Jungah Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/724,568

(22) PCT Filed: Dec. 30, 2022

(86) PCT No.: PCT/KR2022/021734
§ 371 (c)(1),
(2) Date: Jun. 26, 2024

(87) PCT Pub. No.: WO2023/128704
PCT Pub. Date: Jul. 6, 2023

(65) Prior Publication Data
US 2025/0063179 A1     Feb. 20, 2025

(30) Foreign Application Priority Data
Dec. 30, 2021     (KR) ........................ 10-2021-0192930

(51) Int. Cl.
*H04N 19/00*     (2014.01)
*H04N 19/132*     (2014.01)
(Continued)

(52) U.S. Cl.
CPC ......... *H04N 19/159* (2014.11); *H04N 19/132* (2014.11); *H04N 19/186* (2014.11); *H04N 19/196* (2014.11)

(58) Field of Classification Search
None
See application file for complete search history.

(56) References Cited

U.S. PATENT DOCUMENTS

2021/0168361 A1* 6/2021 Zhao ..................... H04N 19/593
2021/0337188 A1* 10/2021 Chen ..................... H04N 19/593
(Continued)

FOREIGN PATENT DOCUMENTS

KR     10-2019-0062302 A     6/2019
KR     10-2021-0100739 A     8/2021
WO         2021136498 A1     7/2021

OTHER PUBLICATIONS

Choi. "WO 2020/180119 A1 Translation". (Year: 2020).*
(Continued)

*Primary Examiner* — Zhihan Zhou
(74) *Attorney, Agent, or Firm* — Bryan Cave Leighton Paisner LLP

(57)     ABSTRACT
Provided are an image encoding/decoding method and apparatus. An image decoding method may comprise deriving chroma reference samples located around a chroma block and luma reference samples corresponding to the chroma reference samples based on an intra prediction mode of the chroma block being a cross-component linear model (CCLM) mode, deriving CCLM parameters based on the chroma reference samples and the luma reference samples, and generating a prediction sample of the chroma block based on the CCLM parameters. The chroma reference samples may be obtained from two or more chroma reference lines adjacent to the chroma block.

12 Claims, 12 Drawing Sheets

(51) Int. Cl.
       *H04N 19/159*          (2014.01)
       *H04N 19/186*          (2014.01)
       *H04N 19/196*          (2014.01)

(56)                    References Cited

U.S. PATENT DOCUMENTS

2021/0344902 A1* 11/2021 Zhang .................. H04N 19/186
2021/0368165 A1* 11/2021 Choi .................... H04N 19/105
2022/0070474 A1*  3/2022 Lim ..................... H04N 19/593
2022/0295056 A1*  9/2022 Lim .................... H04N 19/117
2022/0329816 A1* 10/2022 Liu ..................... H04N 19/176

OTHER PUBLICATIONS

ISO/IEC JTC 1/SC 29/WG 5 "Test Model 13 for Versatile Video
Coding (VTM 13)," MPEG Joint Video Coding Team(s) with ITU-T
SG 16, 103 pages, Apr. 2021.

* cited by examiner

FIG. 6

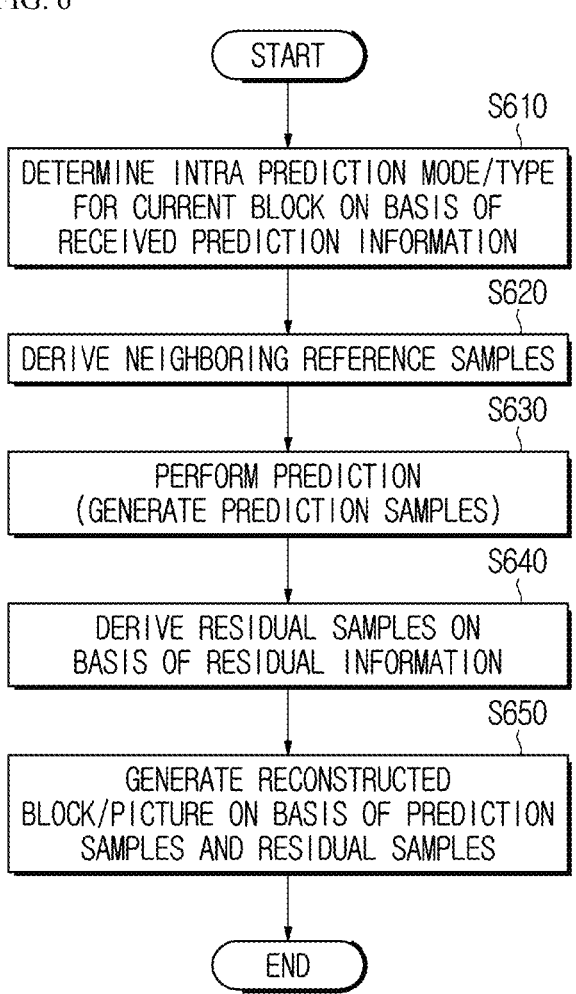

START

S610
DETERMINE INTRA PREDICTION MODE/TYPE
FOR CURRENT BLOCK ON BASIS OF
RECEIVED PREDICTION INFORMATION

S620
DERIVE NEIGHBORING REFERENCE SAMPLES

S630
PERFORM PREDICTION
(GENERATE PREDICTION SAMPLES)

S640
DERIVE RESIDUAL SAMPLES ON
BASIS OF RESIDUAL INFORMATION

S650
GENERATE RECONSTRUCTED
BLOCK/PICTURE ON BASIS OF PREDICTION
SAMPLES AND RESIDUAL SAMPLES

END

FIG. 7

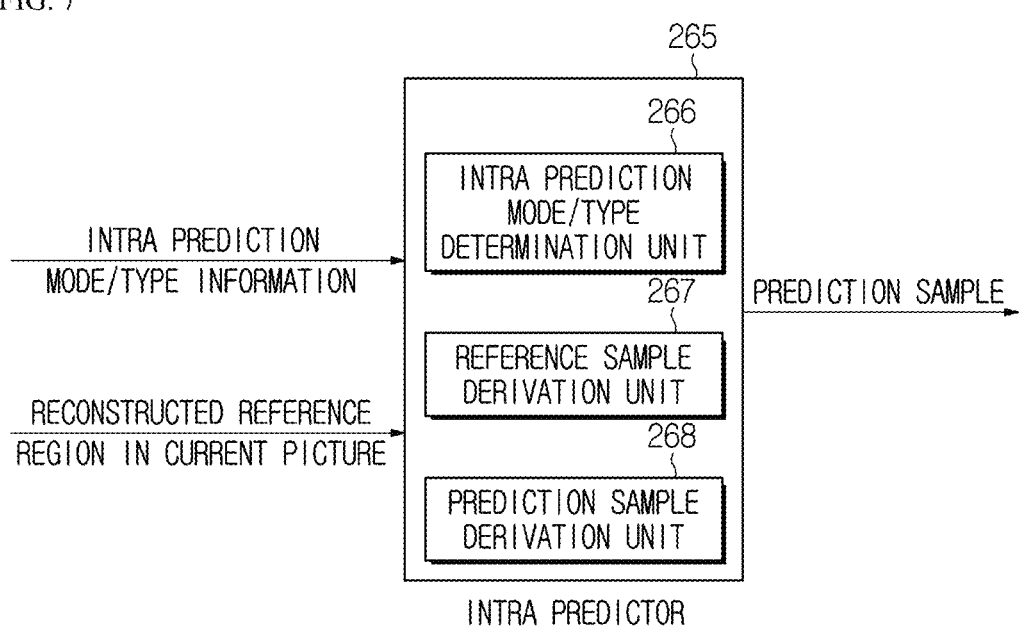

265

266
INTRA PREDICTION
MODE/TYPE
DETERMINATION UNIT

INTRA PREDICTION
MODE/TYPE INFORMATION

267
REFERENCE SAMPLE
DERIVATION UNIT

PREDICTION SAMPLE

RECONSTRUCTED REFERENCE
REGION IN CURRENT PICTURE

268
PREDICTION SAMPLE
DERIVATION UNIT

INTRA PREDICTOR

Threshold = 17

8x8 co-located
luma block

4x4 chroma block

8x8 co-located
luma block

4x4 chroma block

8x4 chroma block

4x8 chroma block

16x4 chroma block
with original above sub-sampling

16x4 chroma block
with modified above sub-sampling

CROSS-COMPONENT LINEAR MODEL (CCLM) INTRA PREDICTION-BASED VIDEO ENCODING/DECODING METHOD, APPARATUS, AND RECORDING MEDIUM FOR STORING BITSTREAM

This application is the National Stage filing under 35 U.S.C. 371 of International Application No. PCT/KR2022/021734, filed on Dec. 30, 2022 which claims the benefit of earlier filing date and right of priority to Korean Application No. 10-2021-0192930, filed on Dec. 30, 2021, the contents of which are all incorporated by reference herein in their entireties.

TECHNICAL FIELD

The present disclosure relates to an image encoding/decoding method and apparatus, and, more particularly, to an image encoding/decoding method and apparatus based on cross-component linear model (CCLM) intra prediction and a recording medium storing a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus that performs cross-component linear model (CCLM) intra prediction.

Another object of the present disclosure is to provide an image encoding/decoding method and apparatus that performs multi-reference line-based CCLM intra prediction.

Another object of the present disclosure is to provide an image encoding/decoding method and apparatus that performs improved Linear-Mean-Square (LMS)-based CCLM intra prediction.

Another object of the present disclosure is to provide an image encoding/decoding method and apparatus that performs linear model CCLM intra prediction using a predetermined number of improved pixels.

Another object of the present disclosure is to provide an image encoding/decoding method and apparatus that adaptively performs multi-reference line-based CCLM intra prediction.

Another object of the present disclosure is to provide a non-transitory computer-readable recording medium storing a bitstream generated by an image encoding method or apparatus according to the present disclosure.

Another object of the present disclosure is to provide a non-transitory computer-readable recording medium storing a bitstream received, decoded and used to reconstruct an image by an image decoding apparatus according to the present disclosure.

Another object of the present disclosure is to provide a method of transmitting a bitstream generated by an image encoding method or apparatus according to the present disclosure.

The technical problems solved by the present disclosure are not limited to the above technical problems and other technical problems which are not described herein will become apparent to those skilled in the art from the following description.

TECHNICAL SOLUTION

According to an embodiment of the present disclosure, an image decoding method performed by an image decoding apparatus may comprise deriving chroma reference samples located around a chroma block and luma reference samples corresponding to the chroma reference samples based on an intra prediction mode of the chroma block being a cross-component linear model (CCLM) mode, deriving CCLM parameters based on the chroma reference samples and the luma reference samples, and generating a prediction sample of the chroma block based on the CCLM parameters. The chroma reference samples may be obtained from two or more chroma reference lines adjacent to the chroma block.

According to an embodiment of the present disclosure, the deriving the CCLM parameters may be performed based on linear-mean-square (LMS) using the chroma reference samples present in the two or more chroma reference lines adjacent to the chroma block.

According to an embodiment of the present disclosure, the deriving the CCLM parameters may use a predetermined number of chroma reference samples present in the two or more chroma reference lines adjacent to the chroma block.

According to an embodiment of the present disclosure, a subsampling method for a first reference line adjacent to the chroma block and a subsampling method for a second reference line adjacent to the chroma block may be the same based on the chroma block being a non-square block.

According to an embodiment of the present disclosure, a subsampling method for a first reference line adjacent to the chroma block and a subsampling method for a second reference line adjacent to the chroma block may be different based on the chroma block being a non-square block.

According to an embodiment of the present disclosure, the number of chroma reference lines for deriving the chroma reference samples may be differently determined, based on a top boundary of the chroma block matching a CTU boundary.

According to an embodiment of the present disclosure, based on the number of two or more chroma reference lines being N, a down-sampled i-th upper luma reference line may be generated based on a $(2i-1)$-th upper luma reference line and a $2i$-th upper luma reference line among a plurality of $2N$ upper luma reference lines, i being an integer between 1 and N, and the luma reference samples may be obtained based on the down-sampled N upper luma reference lines.

According to an embodiment of the present disclosure, based on the number of two or more chroma reference lines being N, a down-sampled i-th left luma reference line may be generated based on a $(2i-1)$-th left luma reference line, a 2i-th left luma reference line and a (2i+1)-th left luma reference line among a plurality of 2N+1 left luma reference lines, i being an integer between 1 and N, and the luma reference samples may be obtained based on the down-sampled N left luma reference lines.

According to an embodiment of the present disclosure, the number of chroma reference lines used to derive the CCLM parameters may be differently determined based on a comparison between a size of the chroma block and a predetermined threshold.

According to an embodiment of the present disclosure, the number of chroma reference lines used to derive the CCLM parameters may be differently determined based on a type of CCLM applied to the chroma block.

According to an embodiment of the present disclosure, the deriving the CCLM parameters may further comprises classifying the luma reference samples and the chroma reference samples into two or more groups based on a predetermined threshold and deriving the CCLM parameters for each classified group.

According to an embodiment of the present disclosure, an image encoding method performed by an image encoding apparatus may comprise deriving chroma reference samples located around a chroma block and luma reference samples corresponding to the chroma reference samples based on an intra prediction mode of the chroma block being a cross-component linear model (CCLM) mode, deriving CCLM parameters based on the chroma reference samples and the luma reference samples, and generating a prediction sample of the chroma block based on the CCLM parameters. The chroma reference samples may be obtained from two or more chroma reference lines adjacent to the chroma block.

According to an embodiment of the present disclosure, a computer-readable recording medium storing a bitstream generated by an image encoding method may comprise deriving chroma reference samples located around a chroma block and luma reference samples corresponding to the chroma reference samples based on an intra prediction mode of the chroma block being a cross-component linear model (CCLM) mode, deriving CCLM parameters based on the chroma reference samples and the luma reference samples, and generating a prediction sample of the chroma block based on the CCLM parameters. The chroma reference samples may be obtained from two or more chroma reference lines adjacent to the chroma block.

According to an embodiment of the present disclosure, a method of transmitting a bitstream generated by an image encoding method may comprise deriving chroma reference samples located around a chroma block and luma reference samples corresponding to the chroma reference samples based on an intra prediction mode of the chroma block being a cross-component linear model (CCLM) mode, deriving CCLM parameters based on the chroma reference samples and the luma reference samples, and generating a prediction sample of the chroma block based on the CCLM parameters. The chroma reference samples may be obtained from two or more chroma reference lines adjacent to the chroma block.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus that performs cross-component linear model (CCLM) intra prediction.

Also, according to the present disclosure, it is possible to provide an image encoding/decoding method and apparatus that performs multi-reference line-based CCLM intra prediction.

Also, according to the present disclosure, it is possible to provide an image encoding/decoding method and apparatus that performs improved Linear-Mean-Square (LMS)-based CCLM intra prediction.

Also, according to the present disclosure, it is possible to provide an image encoding/decoding method and apparatus that performs linear model CCLM intra prediction using a predetermined number of improved pixels.

Also, according to the present disclosure, it is possible to provide an image encoding/decoding method and apparatus that adaptively performs multi-reference line-based CCLM intra prediction.

Also, according to the present disclosure, it is possible to provide a non-transitory computer-readable recording medium storing a bitstream generated by an image encoding method or apparatus according to the present disclosure.

Also, according to the present disclosure, it is possible to provide a non-transitory computer-readable recording medium storing a bitstream received, decoded and used to reconstruct an image by an image decoding apparatus according to the present disclosure.

Also, according to the present disclosure, it is possible to provide a method of transmitting a bitstream generated by an image encoding method or apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 6 is a flowchart illustrating an intra prediction based video/image decoding method.

FIG. 7 is a view illustrating a configuration of the intra prediction unit according to the present disclosure.

MODE FOR INVENTION

Figure 1:
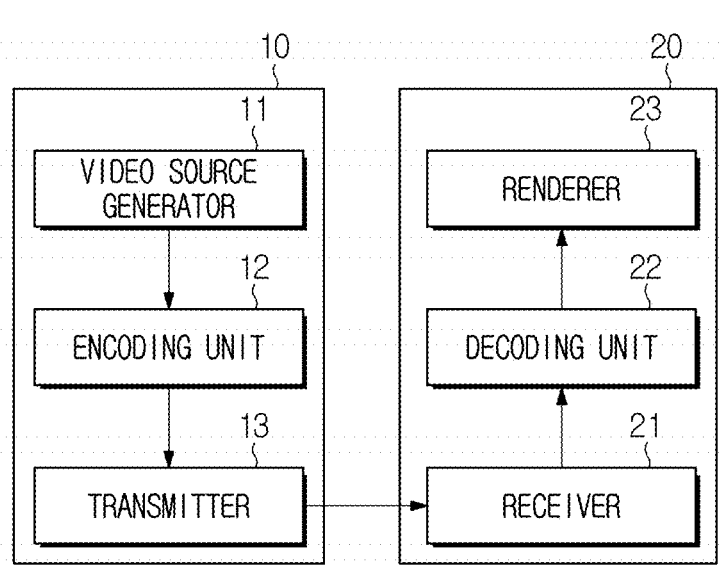
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "video" may mean a set of images over time.

In the present disclosure, "picture" generally means the basis representing one image in a particular time period, and a slice/tile is an encoding basis constituting a part of a picture. One picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. One unit may include one luma block and two chroma (e.g., Cb, Cr) blocks. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The luma component block of the current block may be expressed by including an explicit description of a luma component block such as "luma block" or "current luma block. In addition, the "chroma component block of the current block" may be expressed by including an explicit description of a chroma component block, such as "chroma block" or "current chroma block".

In the present disclosure, the term "/" and "," should be interpreted to indicate "and/or". For instance, the expression "A/B" and "A, B" may mean "A and/or B." Further, "A/B/C" and "A, B, C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

In the present disclosure, "at least one of A, B, and C" may mean "only A," "only B," "only C," or "any and all combinations of A, B, and C." In addition, "at least one A, B or C" or "at least one A, B and/or C" may mean "at least one A, B and C."

Parentheses used in the present disclosure may mean "for example." For example, if "prediction (intra prediction)" is indicated, "intra prediction" may be proposed as an example of "prediction." In other words, "prediction" in the present disclosure is not limited to "intra prediction," and "intra prediction" may be proposed as an example of "prediction." In addition, even when "prediction (i.e., intra prediction)" is indicated, "intra prediction" may be proposed as an example of "prediction."

Overview of Video Coding System

FIG. 1 is a view schematically showing a video coding system to which an embodiment of the present disclosure is applicable.

The video coding system according to an embodiment may include an encoding device 10 and a decoding device 20. The encoding device 10 may deliver encoded video and/or image information or data to the decoding device 20 in the form of a file or streaming via a digital storage medium or network.

The encoding device 10 according to an embodiment may include a video source generator 11, an encoder 12 and a transmitter 13. The decoding device 20 according to an embodiment may include a receiver 21, a decoder 22 and a renderer 23. The encoder 12 may be called a video/image encoding apparatus, and the decoder 22 may be called a video/image decoding apparatus. The transmitter 13 may be included in the encoder 12. The receiver 21 may be included in the decoder 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoder 12 may encode an input video/image. The encoder 12 may perform a series of procedures such as prediction, transform, and quantization for compression and coding efficiency. The encoder 12 may output encoded data (encoded video/image information) in the form of a bitstream.

The transmitter 13 may transmit the encoded video/image information or data output in the form of a bitstream to the receiver 21 of the decoding device 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The transmitter 13 may be provided as a separate transmission device from the encoder 120. In this case, the transmission device includes at least one processor that acquires encoded video/image information or data output in the form of a bitstream and a transmitter that delivers it in the form of a file or streaming. The receiver 21 may extract/receive the bitstream from the storage medium or network and transmit the bitstream to the decoder 22.

The decoder 22 may decode the video/image by performing a series of procedures such as dequantization, inverse transform, and prediction corresponding to the operation of the encoder 12.

The renderer 23 may render the decoded video/image. The rendered video/image may be displayed through the display.

Overview of Image Encoding Apparatus

Figure 2:
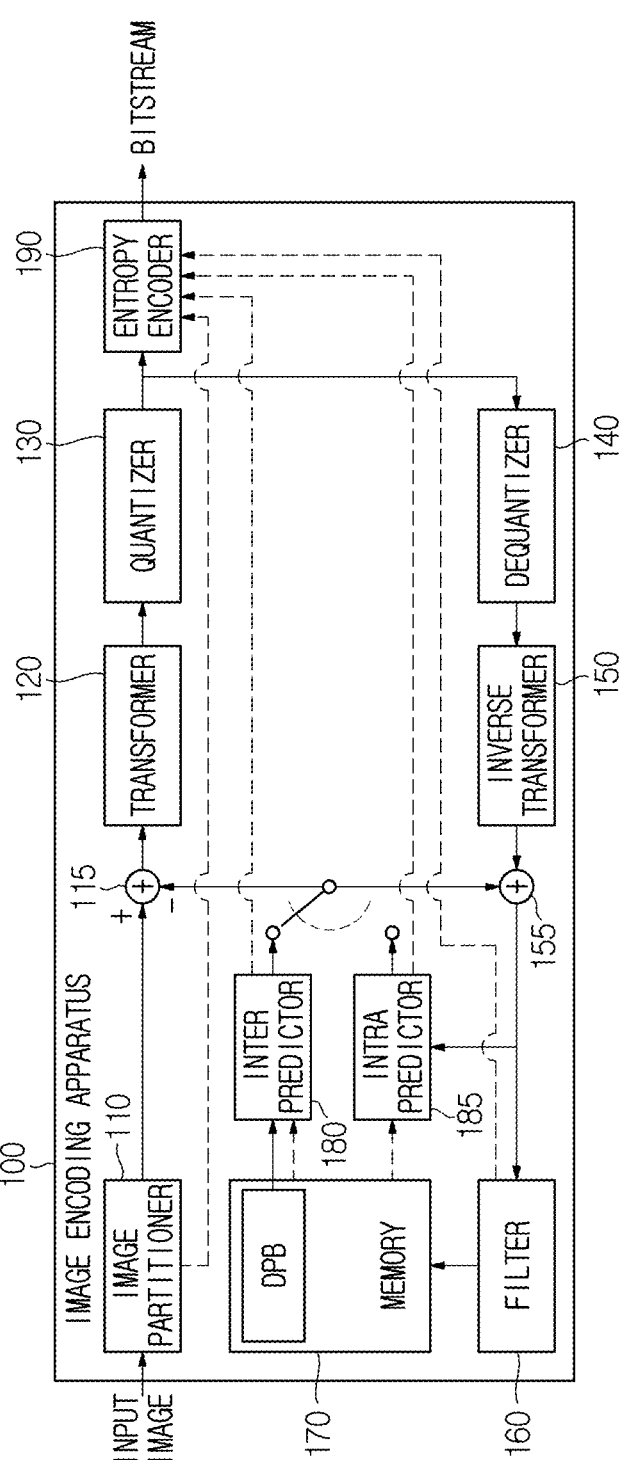
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

Meanwhile, as described below, luma mapping with chroma scaling (LMCS) is applicable in a picture encoding process.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180) and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
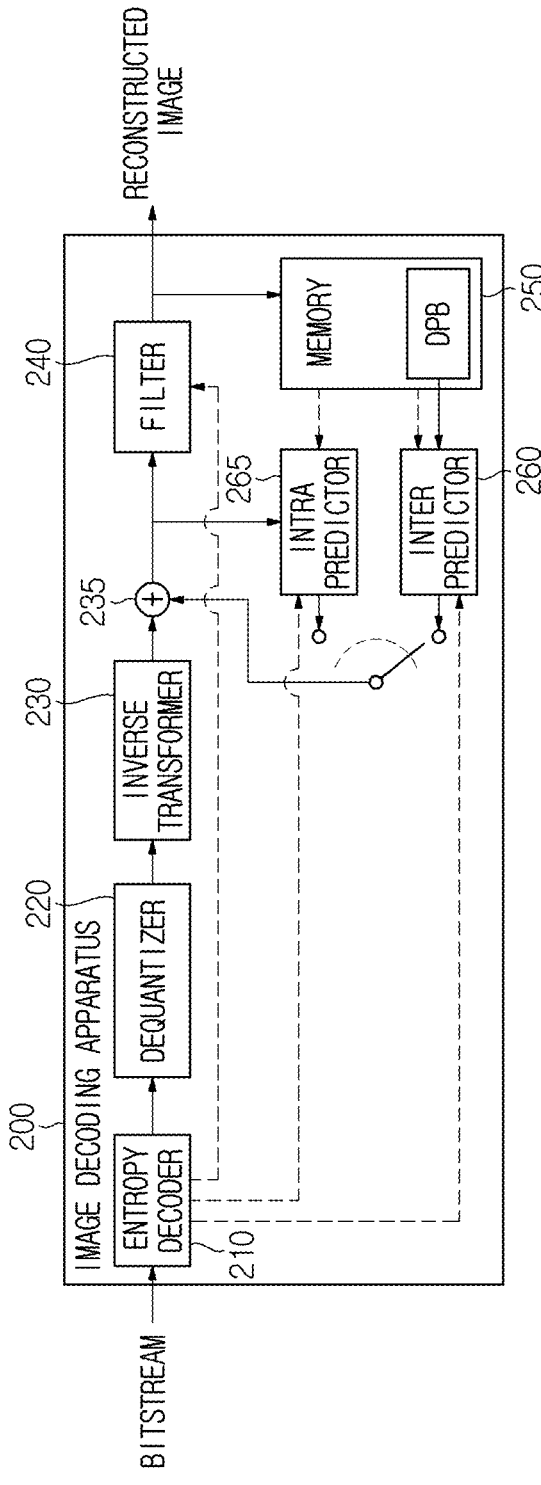
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 160 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Intra Prediction

Hereinafter, intra prediction according to the present disclosure will be described.

Intra prediction may represent prediction for generating prediction samples for a current block based on reference samples in a picture to which a current block belongs (hereinafter referred to as a current picture). When intra prediction applies to a current block, neighboring reference samples to be used for intra prediction of the current block may be derived. The neighboring reference samples of the current block may include a total of 2×nh samples neighbor/adjacent to a left boundary of the current block having a size of nW×nH and samples adjacent to a bottom-left, a total of 2×nW samples adjacent to a top boundary of the current block and samples adjacent to a top-right, and one sample adjacent to a top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to a right boundary of the current block having a size of nW×nH, a total of nW samples adjacent to a bottom boundary of the current block and one sample adjacent to a bottom-right of the current block.

However, some of the neighboring reference samples of the current block have not yet been decoded or may not be available. In this case, the decoder may construct neighboring reference samples to be used for prediction by substituting unavailable samples with available samples. Alternatively, neighboring reference samples to be used for prediction may be constructed through interpolation of available samples.

When the neighboring reference samples are derived, (i) a prediction sample may be derived based on an average or interpolation of neighboring reference samples of the current block, and (ii) the prediction sample may be derived based on a reference sample present in a specific (prediction) direction with respect to the prediction sample among the neighboring reference samples of the current block. The case of (i) may be called a non-directional mode or a non-angular mode, and the case of (ii) may be called a directional mode or an angular mode.

Also, the prediction sample may be generated through interpolation of the first neighboring sample positioned in the prediction direction of the intra prediction mode of the current block based on the prediction target sample of the current block among the neighboring reference samples and the second neighboring sample positioned in the opposite direction thereof. The above-described case may be referred to as linear interpolation intra prediction (LIP).

In addition, chroma prediction samples may be generated based on luma samples using a linear model. This case may be called an LM (linear model) mode.

In addition, a temporary prediction sample of the current block may be derived based on the filtered neighboring reference samples, and the prediction sample of the current block may be derived by a weighted sum of at least one reference sample derived according to the intra prediction mode among the existing neighboring reference samples, that is, unfiltered neighboring reference samples, and the temporary prediction sample. The above-described case may be referred to as position dependent intra prediction (PDPC).

In addition, a reference sample line with the highest prediction accuracy is selected from among multiple neighboring reference sample lines of the current block, to derive the prediction sample using the reference sample located in the prediction direction in the corresponding line, and, at this time, information on the used reference sample line (e.g., intra_luma_ref_idx) may be encoded in a bitstream and signaled. This case may be referred to as multi-reference line (MRL) intra prediction or MRL-based intra prediction. When MRL is not applied, reference samples may be derived from reference sample lines directly adjacent to the current block and in this case, information on the reference sample lines may not be signaled.

In addition, the current block may be partitioned into vertical or horizontal sub-partitions and intra prediction may be performed based on the same intra prediction mode for each subpartition. In this case, the neighboring reference samples of the intra prediction may be derived in units of sub-partitions. That is, the reconstructed sample of the previous sub-partition in the encoding/decoding order may be used as the neighboring reference sample of the current sub-partition. In this case, the intra prediction mode for the current block is equally applied to the sub-partitions, but the intra prediction performance may be improved in some cases by deriving and using neighboring reference samples in units of sub-partitions. This prediction method may be called intra sub-partitions (ISP) or ISP-based intra prediction.

These intra prediction techniques may be called an intra prediction type or additional intra prediction mode to be distinguished from a direction or non-directional intra prediction mode. The intra prediction technique (intra prediction type, additional intra prediction mode, etc.) may be referred to as various terms such as an intra prediction technique or an additional intra prediction mode. For example, the intra prediction type (or additional intra prediction mode, etc.) may include at least one of the aforementioned LIP, LM, PDPC, MRL or ISP. A general intra prediction method excluding a specific intra prediction type such as LIP, LM, PDPC, MRL, and ISP may be referred to as a normal intra prediction type. The normal intra prediction type may be generally applied when the above specific intra prediction type is not applied, and prediction may be performed based on the above-described intra prediction mode. Meanwhile, if necessary, post-processing filtering may be performed on the derived prediction sample.

Specifically, the intra prediction procedure may include an intra prediction mode/type determination step, a neighboring reference sample derivation step, and an intra prediction mode/type based prediction sample derivation step. In addition, if necessary, a post-filtering step may be performed on the derived prediction sample.

Meanwhile, in addition to the above-described intra prediction types, affine linear weighted intra prediction (ALWIP) may be used. The ALWIP may be referred to as linear weighted intra prediction (LWIP) or matrix weighted intra prediction or matrix based intra prediction (MIP). If the MIP is applied to the current block, i) neighboring reference samples on which an averaging procedure has been performed is used, ii) matrix-vector-multiplication procedure is performed, and iii) a horizontal/vertical interpolation procedure is further performed to derive prediction samples for the current block as necessary. The intra prediction modes used for the MIP may be configured to be different from the intra prediction modes used in the LIP, PDPC, MRL, ISP intra prediction or normal intra prediction. The intra prediction mode for the MIP may be called a MIP intra prediction mode, a MIP prediction mode, or a MIP mode. For example, a matrix and offset used in the matrix vector multiplication may be set differently according to the intra prediction mode for the MIP. Here, the matrix may be called a (MIP) weighting matrix, and the offset may be called a (MIP) offset vector or a (MIP) bias vector. A specific MIP method will be described later.

The block reconstruction procedure based on intra prediction and the intra prediction unit in the encoding apparatus will be described later with reference to FIGS. 4 and 5.

Figure 4:
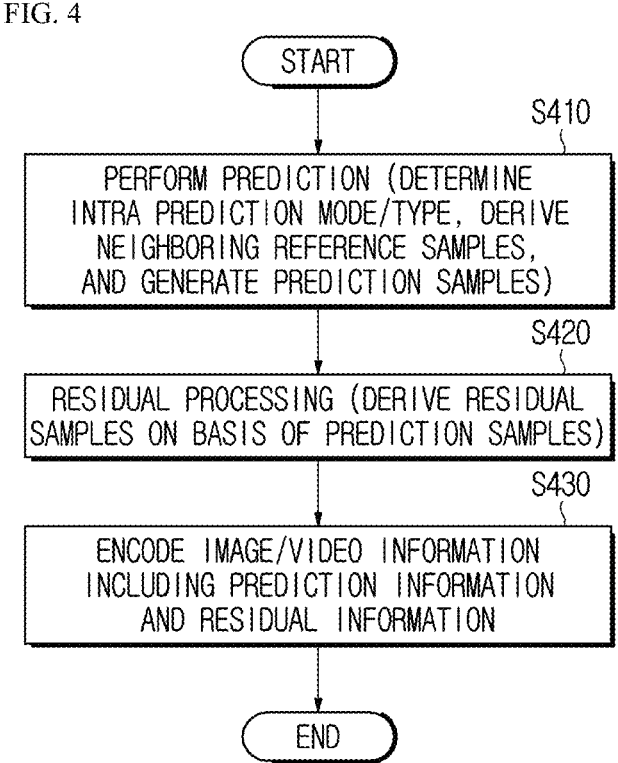
FIG. 4 is a flowchart illustrating an intra prediction based video/image encoding method.

FIG. 4 is a flowchart illustrating an intra prediction based video/image encoding method.

The encoding method of FIG. 4 may be performed by the image encoding apparatus of FIG. 2. Specifically, step S410 may be performed by the intra prediction unit 185 and step S420 may be performed by the residual processor. Specifically, step S420 may be performed by the subtractor 115. Step S430 may be performed by the entropy encoder 190. The prediction information of step S430 may be derived by the intra prediction unit 185, and the residual information of step S430 may be derived by the residual processor. The residual information is information on residual samples. The residual information may include information on quantized transform coefficients for the residual samples. As described above, the residual samples may be derived as transform coefficients through the transformer 120 of the encoding apparatus, and the transform coefficients may be derived as quantized transform coefficients through the quantizer 130. Information on the quantized transform coefficients may be encoded by the entropy encoder 190 through a residual coding procedure.

The image encoding apparatus may perform intra prediction with respect to the current block (S410). The image encoding apparatus may derive an intra prediction mode/type for the current block, derive neighboring reference samples of the current block, and generate prediction samples in the current block based on the intra prediction mode/type and the neighboring reference samples. Here, a procedure for determining an intra prediction mode/type, a procedure for deriving neighboring reference samples and a procedure for generating prediction samples may be simultaneously performed, or any one procedure may be performed before another procedure.

Figure 5:
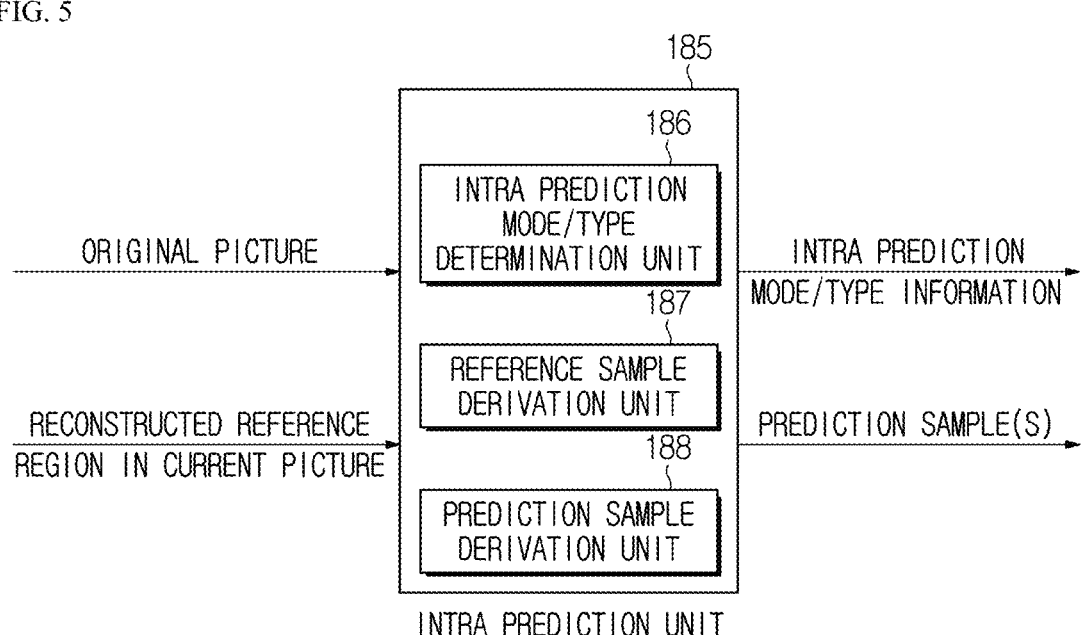
FIG. 5 is a view illustrating a configuration of the intra prediction unit according to the present disclosure.

FIG. 5 is a view illustrating a configuration of the intra prediction unit 185 according to the present disclosure.

As shown in FIG. 5, the intra prediction unit 185 of the encoding apparatus may include an intra prediction mode/type determination unit 186, a reference sample derivation unit 187, a prediction sample derivation unit 188. The intra prediction mode/type determination unit 186 may determine the intra prediction mode/type for the current block, the reference sample derivation unit 187 may derive neighboring reference samples of the current block, and the prediction sample derivation unit 188 may derive the prediction samples of the current block. Meanwhile, although not shown, when the below-described prediction sample filtering procedure is performed, the intra prediction unit 185 may further include a prediction sample filter (not shown).

The image encoding apparatus may determine a mode/type applied to the current block from among a plurality of intra prediction modes/types. The encoding apparatus may compare RD costs of the intra prediction modes/types and determine an optimal intra prediction mode/type for the current block.

Meanwhile, the image encoding apparatus may perform a prediction sample filtering procedure. Predictive sample filtering may be referred to as post filtering. Some or all of the prediction samples may be filtered by the prediction sample filtering procedure. In some cases, the prediction sample filtering procedure may be omitted.

Referring to FIG. 4 again, the image encoding apparatus may generate residual samples for the current block based on prediction samples or filtered prediction samples (S420). The image encoding apparatus may derive the residual samples by subtracting the prediction samples from the original samples of the current block. That is, the image encoding apparatus may derive the residual sample value by subtracting the prediction sample value from the original sample value.

The image encoding apparatus may encode image information including information on intra prediction (prediction information) and residual information of the residual samples (S430). The prediction information may include the intra prediction mode information and the intra prediction type information. The encoding apparatus may output encoded image information in the form of a bitstream. The output bitstream may be transmitted to the decoding apparatus through a storage medium or a network.

The residual information may include a residual coding syntax described below. The encoding apparatus may transform/quantize the residual samples to derive quantized transform coefficients. The residual information may include information on the quantized transform coefficients.

Meanwhile, as described above, the image encoding apparatus may generate a reconstructed picture (including reconstructed samples and a reconstructed block). To this end, the encoding apparatus may perform dequantization/inverse transform with respect to the quantized transform coefficients again to derive (modified) residual samples. The residual samples are transformed/quantized and then dequantized/inversely transformed, in order to derive the same residual samples as the residual samples derived in the decoding apparatus as described above. The image encoding apparatus may generate a reconstructed block including the reconstructed samples for the current block based on the prediction samples and the (modified) residual samples. A reconstructed picture for the current picture may be generated based on the reconstructed block. As described above, an in-loop filtering procedure is further applicable to the reconstructed picture.

FIG. 6 is a flowchart illustrating an intra prediction based video/image decoding method.

The image decoding apparatus may perform operation corresponding to operation performed by the image encoding apparatus.

The decoding method of FIG. 6 may be performed by the image decoding apparatus of FIG. 3. S610 to S630 may be performed by the intra prediction unit 265 of the decoding apparatus, and the prediction information of S610 and the residual information of S640 may be obtained from the bitstream by the entropy decoder 210 of the decoding apparatus. The residual processor of the image decoding apparatus may derive the residual samples for the current block based on the residual information (S640). Specifically, the dequantizer 220 of the residual processor may perform dequantization based on quantized transform coefficients derived based on the residual information to derive transform coefficients, and the dequantizer 230 of the residual processor may perform inverse transform with respect to the transform coefficients to derive the residual samples for the current block. Step S650 may be performed by the adder 235 or the reconstructor of the decoding apparatus.

Specifically, the image decoding apparatus may derive a intra prediction mode/type for the current block based on the received prediction information (intra prediction mode/type information) (S610). The image decoding apparatus may derive neighboring reference samples of the current block (S620). The image decoding apparatus may generate prediction samples in the current blocks based on the intra prediction mode/type and the neighboring reference samples (S630). In this case, the image decoding apparatus may perform a prediction sample filtering procedure. Predictive sample filtering may be referred to as post filtering. Some or all of the prediction samples may be filtered by the prediction sample filtering procedure. In some cases, the prediction sample filtering procedure may be omitted.

The image decoding apparatus generates residual samples for the current block based on the received residual information (S640). The image decoding apparatus may generate reconstructed samples for the current block based on the prediction samples and the residual samples, and derive a reconstructed block including the reconstructed samples (S650). A reconstructed picture for the current picture may be generated based on the reconstructed block. As described above, the in-loop filtering procedure is further applicable to the reconstructed picture.

FIG. 7 is a view illustrating a configuration of the intra prediction unit 265 according to the present disclosure.

As shown in FIG. 7, the intra prediction unit 265 of the image decoding apparatus may include an intra prediction mode/type determination unit 266, a reference sample derivation unit 267 and a prediction sample derivation unit 268, the intra prediction mode/type determination unit 266 may determine the intra prediction mode/type for the current block based on the intra prediction mode/type information obtained by the intra prediction mode/type determination unit 186 of the image encoding apparatus, the reference sample derivation unit 266 may derive the neighboring reference samples of the current block, and the prediction sample derivation unit 268 may derive the prediction samples of the current block. Meanwhile, although not shown, when the above-described prediction sample filtering procedure is performed, the intra prediction unit 265 may further include a prediction sample filter (not shown).

The intra prediction mode information may include flag information (e.g., intra_luma_mpm_flag) specifying whether a most probable mode (MPM) or a remaining mode applies to the current block, and, when the MPM applies to the current block, the intra prediction mode information may further include index information (e.g., intra_luma_mpm_idx) specifying one of intra prediction mode candidates (MPM candidates). The intra prediction mode candidates (MPM candidates) may be configured as an MPM candidate list or an MPM list. In addition, when the MPM does not apply to the current block, the intra prediction mode information may further include remaining mode information (e.g., intra_luma_mpm_remainder) specifying one of the remaining intra prediction modes excluding the intra prediction mode candidates (MPM candidates). The decoding apparatus may determine the intra prediction mode of the current block based on the intra prediction mode information.

In addition, the intra prediction technique information may be implemented in various forms. For example, the intra prediction technique information may include intra prediction technique index information specifying one of the intra prediction techniques. As another example, the intra prediction technique information may include at least one of reference sample line information (e.g., intra_luma_ref_idx)) specifying whether the MRL applies to the current block and which reference sample line is used if applied, ISP flag information (e.g., intra_subpartitions_mode_flag) specifying whether the ISP applies to the current block, ISP type information (e.g., intra_subpartitions_split_flag) specifying the split type of subpartitions when the ISP applies, flag information specifying whether PDPC applies or flag information specifying whether LIP applies. In addition, the intra prediction type information may include an MIP flag specifying whether MIP is applied to the current block. In the present disclosure, the ISP flag information may be referred to as an ISP application indicator.

The intra prediction mode information and/or the intra prediction type information may be encoded/decoded through the coding method described in the present disclosure. For example, the intra prediction mode information and/or the intra prediction type information may be encoded/decoded through entropy coding (e.g., CABAC or CAVLC) based on truncated (rice) binary code.

Meanwhile, the intra prediction mode may further include a cross-component linear model (CCLM) mode for chroma samples in addition to the PLANAR mode, DC mode and angular intra prediction modes. The CCLM mode may be split into L_CCLM, T_CCLM, LT_CCLM according to whether left samples, top samples or both thereof is considered for CCLM parameter derivation and may apply only to a chroma component.

The intra prediction mode may be indexed, for example, as shown in Table 1 below.

TABLE 1

| Intra prediction mode | Associated name |
| --- | --- |
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

Meanwhile, the intra prediction type (or additional intra prediction mode) may include at least one of the LIP, PDPC, MRL, ISP or MIP. The intra prediction type may be indicated based on intra prediction type information, and the intra prediction type information may be implemented in various forms. For example, the intra prediction type information may include intra prediction type index information indicating one of the intra prediction types. As another example, the intra prediction type information may include at least one of reference sample line information (e.g., intra_luma_ref_idx) indicating whether the MRL is applied to the current block and, if applicable, which reference sample line is used, ISP flag information (e.g., Intra_subpartitions_mode_flag) indicating whether the ISP is applied to the current block, ISP type information (e.g., Intra_subpartitions_split_flag) indicating the split type of subpartitions when the ISP is applied, flag information indicating whether PDCP is applied, or flag information whether LIP is applied. In addition, the intra prediction type information may include a MIP flag (or referred to as intra_mip_flag) indicating whether MIP is applied to the current block.

MRL (Multi-Reference Line) Intra Prediction

Figure 8:
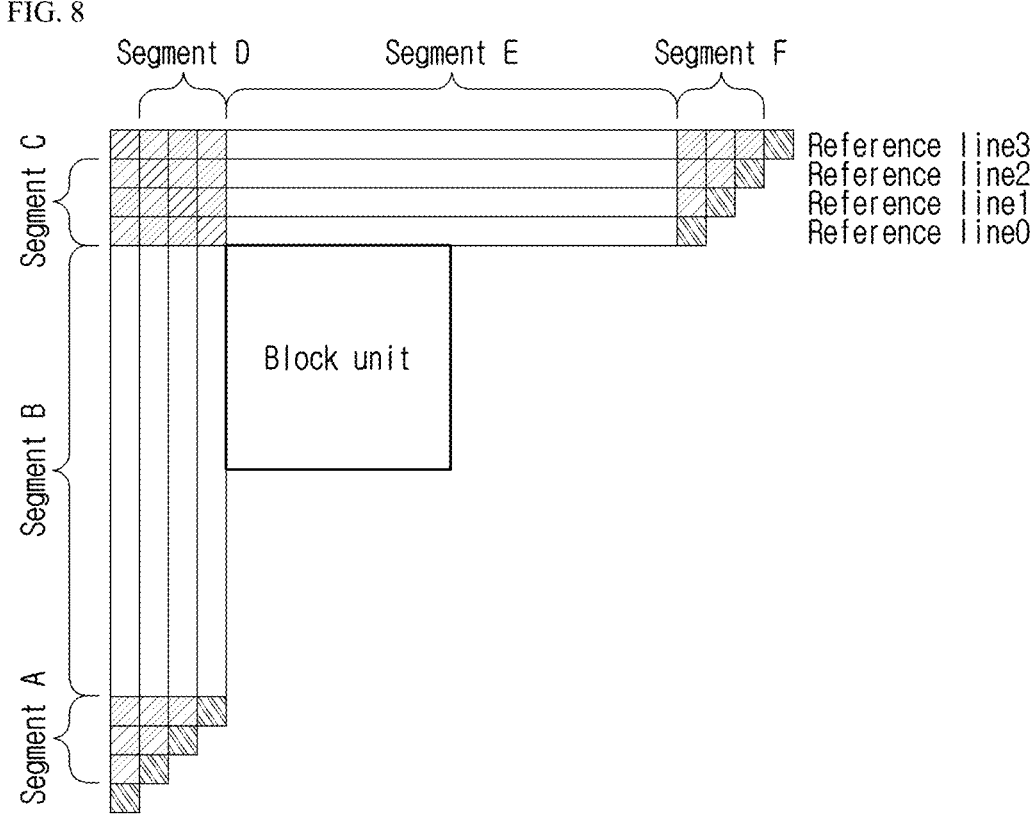
FIG. 8 is a diagram showing multi-reference line for intra prediction according to an embodiment of the present disclosure.

FIG. 8 is a diagram showing multi-reference line for intra prediction according to an embodiment of the present disclosure.

In the conventional intra prediction, only the neighboring samples of the top first line and the left first line of the current block were used as reference samples for intra prediction. However, in the multiple-reference line (MRL) method, intra prediction may be performed using neighboring samples located on a sample line separated by one to three samples from the upper and/or left side of the current block as reference samples. Alternatively, intra prediction using the MRL method may be performed using, as reference samples, neighboring samples located at a sample separated by N samples from the upper and/or left side of the current block. FIG. 8 shows an example of the multi-reference line, where the multi-reference line index (e.g., mrl_idx) indicates which line is used for intra prediction with respect to the current block.

For example, the multi-reference line index may be signaled through coding unit syntax as shown in Table 2. The multi-reference line index may be configured in the form of an intra_luma_ref_idx_syntax element.

TABLE 2

```
coding_unit( x0, y0, cbWidth, cbHeight, treeType ) {
  if( slice_type != I ) {
  cu_skip_flag[ x0 ][ y0 ]
  if( cu_skip_flag[ x0 ][ y0 ] = = 0 )
  pred_mode_flag
  }
  if( CuPredMode[ x0 ][ y0]   = =   MODE_INTRA ) {
  if( treeType = = SINGLE_TREE   | |   treeType = =
  DUAL_TREE_LUMA ) {
  if( ( y0 % CtbSizeY ) > 0 )
  intra_luma_ref_idx[ x0 ][ y0 ] ...
  if (intra_luma_ref_idx[ x0 ][ y0 ] = = 0)
  intra_luma_mpm_flag[ x0 ][ y0 ]
  if( intra_luma_mpm_flag[ x0 ][ y0 ] )
  intra_luma_mpm_idx[ x0 ][ y0 ]
  Else
  intra_luma_mpm_remainder[ x0 ][ y0 ]
  }
  ...
  }
``` intra_luma_ref_idx[x0][y0] may represent an intra reference line index IntraLumaRefLineIdx[x0][y0]. If intra_luma_ref_idx[x0][y0] is not present, the value thereof may be inferred to be 0), intra_luma_ref_idx may be called (intra) reference sample line index or mrl_idx. Additionally, intra_luma_ref_idx may also be called intra_luma_ref_line_idx. Table 3 below shows the value of IntraLumaRefLineIdx[x0][y0] based on intra_luma_ref_idx[x0][y0].

TABLE 3

| intra_luma_ref_idx[ x0 ][ y0 ] | IntraLumaRefLineIdx[ x0 ][ y0 ] |
|---|---|
| 0 | 0 |
| 1 | 1 |
| 2 | 3 |

MRL may be disabled for blocks of the first line (row) in the CTU. That is, if the upper boundary of the current block is the boundary of the CTU, MRL may not be used for the current block. In Table 2, if the upper boundary of the current block is the boundary of the CTU, intra_luma_ref_idx[x0][y0] is not present, and the value thereof is inferred to be 0). Therefore, the first reference line may be used for the current block. This is to prevent the use of extended reference lines outside the current CTU line. In addition, the aforementioned PDPC may be disabled when the above-described additional reference line is used.

General Prediction Sample Derivation for Chroma Component

When intra prediction is performed on a current block, prediction on a luma component block (luma block) and prediction on a chroma component block (chroma block) of the current block may be performed. In this case, the intra prediction mode for the chroma component (chroma block) may be set separately from the intra prediction mode for the luma component (luma block).

For example, the intra prediction mode for the chroma component may be indicated based on intra chroma prediction mode information, and the intra chroma prediction mode information may be signaled in the form of an intra_chroma_pred_mode syntax element. As an example, the intra chroma prediction mode information may indicate one of candidate modes including at least one of a planar mode, a DC mode, a vertical mode, a horizontal mode, a derived mode (DM), L_CCLM, T_CCLM, or LT_CCLM modes. DM may also be called direct mode. CCLM may be called LM.

Meanwhile, DM and CCLM are dependent intra prediction modes for predicting a chroma block using information on a luma block. The DM may indicate a mode in which the same intra prediction mode as the intra prediction mode for the luma component is applied as the intra prediction mode for the chroma component. In addition, the CCLM may indicate an intra prediction mode in which reconstructed samples of the luma block are subsampled in a process of generating the prediction block for the chroma block and then samples derived by applying CCLM parameters (e.g., α and β) to the subsampled samples are used as the prediction samples of the chroma block.

Overview of Cross-Component Linear Model (CCLM)

Also, a CCLM mode may be applied to the current chroma block. The CCLM mode is an intra prediction mode using correlation between a luma block and a chroma block corresponding to the luma block, and may indicate a mode in which a linear model may be derived based on neighboring samples of the luma block and neighboring samples of the chroma block and prediction samples of the chroma block are derived based on the linear model and the reconstructed samples of the luma block. Specifically, when the CCLM mode is applied to the current chroma block, parameters for the linear model may be derived based on neighboring samples used for intra prediction of the current chroma block and neighboring samples used for intra prediction of the current luma block.

In order to reduce redundancy of cross-components, CCLM prediction mode may be used in the present disclosure. Here, the chroma sample may be predicted based on the reconstructed luma samples of the same CU using a linear model. For example, the linear model may be Equation 1 below.

$$pred_C(i, j) = \alpha \cdot rec'_L(i, j) + \beta \qquad \text{[Equation 1]}$$

where, $pred_c(i,j)$ may represent a prediction sample of $(i,j)$ coordinates of the current chroma block in the current CU, and $rec_L'(i,j)$ may represent reconstructed samples of $(i,j)$ coordinates of the current luma block in the CU. In addition, $rec_L'(i,j)$ may represent a down-sampled reconstructed sample of the current luma block.

Figure 9:
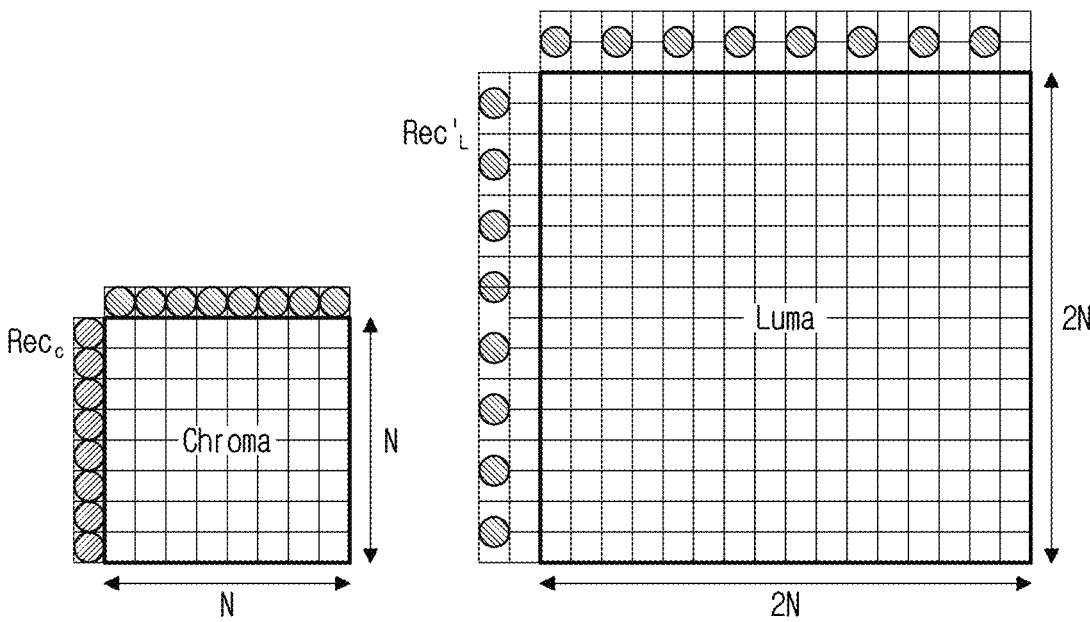
FIG. 9 is a diagram showing the positions of neighboring samples used to derive CCLM parameters according to an embodiment of the present disclosure.

FIG. 9 is a diagram showing the positions of neighboring samples used to derive CCLM parameters according to an embodiment of the present disclosure. FIG. 9 shows an example of the positions of left neighboring samples and upper neighboring samples and samples adjacent to a current block related to CCLM mode.

CCLM parameters (e.g., $\alpha$ and/or $\beta$) may be derived using up to four adjacent chroma samples and down-sampled luma samples corresponding thereto. Alternatively, CCLM parameters may be derived using N neighboring chroma samples and down-sampled luma samples corresponding thereto. If the size of the current chroma block is W×H, W' and H' may be set as follows. W' may refer to the range where upper neighboring chroma samples used to derive CCLM parameters are located. H' may refer to the range where the left neighboring chroma samples used to derive CCLM parameters are located.

When LM mode is applied, W'=W, H'=H

When LM_A mode is applied, W'=W+H

When LM_L mode is applied, H'=H+W

The positions of the upper neighboring samples are S[0, −1] ... S[W'−1, −1], and the positions of the left neighboring samples are S[−1, 0] ... S[−1, H'−1]. In this case, the four samples may be selected as follows.

When LM mode is applied and both upper and left neighboring samples are available: S[W'/4, −1], S[3W'/4, −1], S[−1, H'/4], S[−1, 3H'/4]

When LM_A mode is applied or only upper neighboring samples are available: S[W'/8, −1], S[3W'/8, −1], S[5W'/8, −1], S[7W'/8, −1]

When LM_L mode is applied or only left neighboring samples are available: S[−1, H'/8], S[−1, 3H'/8], S[−1, 5H'/8], S[−1, 7H'/8]

Four neighboring luma samples at positions selected in the above manner may be obtained by down-sampling. Four comparisons may be performed to find the two small values $(x^0{}_A$ and $x^1{}_A)$ and the two large values $(x^0{}_B$ and $x^1{}_B)$ of the four luma samples. Chroma sample values corresponding to the four neighboring samples may be expressed as $y^0{}_A$, $y^1{}_a$, $y^0{}_B$ and $y^1{}_B$. In this case, $X_a$, $X_b$, $Y_a$ and $Y_b$ may be derived through Equation 2 below.

$$X_a = (x_A^0 + x_A^1 + 1) >> 1; \, X_b = (x_B^0 + x_B^1 + 1) >> 1; \qquad \text{[Equation 2]}$$
$$Y_a = (y_A^0 + y_A^1 + 1) >> 1; \, Y_b = (y_B^0 + y_B^1 + 1) >> 1$$

The CCLM parameters $\alpha$ and $\beta$ may be obtained through Equation 3 below.

$$\alpha = \frac{Y_a - Y_b}{X_a - X_b} \qquad \text{[Equation 3]}$$
$$\beta = Y_b - a \cdot X_b$$

One embodiment of the present disclosure may derive CCLM parameters using upper neighboring samples and left neighboring samples, and may also be used in the other two LM modes (LM_A mode and LM_L mode). According to one embodiment of the present disclosure, in LM_A mode, only upper neighboring samples may be used to derive CCLM parameters. In this case, to obtain more samples, upper neighboring samples may be extended to samples at the W+H position. On the other hand, in LM_L mode, only left neighboring samples may be used to derive CCLM parameters. In this case, to obtain more samples, the left neighboring samples may be extended to the samples at the H+W position. As another example, in a non-square block, upper neighboring samples may be extended to the W+W position, and left neighboring samples may be extended to the H+H position.

To match the positions of chroma samples for a 4:2:0 video sequence, two types of down-sampling filters may be applied to luma samples to achieve a 2-to-1 down-sampling ratio in both horizontal and vertical directions. The down-sampling filter may be specified by an SPS level flag. The down-sampling filter may be applied to obtain a luma sample corresponding to a chroma sample at a predetermined position (i, j). The two down-sampling filters may be Equations 4 and 5 below.

$$rec'_L(i, j) = \qquad \text{[Equation 4]}$$

$$rec'_L(i, j) = \begin{bmatrix} rec_L(2i-1, 2j-1) + 2 \cdot rec_L(2i-1, 2j-1) + rec_L(2i+1, 2j-1) + \\ rec_L(2i-1, 2j) + 2 \cdot rec_L(2i, 2j) + rec_L(2i+1, 2j) + 4 \end{bmatrix} >> 3$$

$$rec'_L(i, j) = \begin{bmatrix} rec_L(2i, 2j-1) + rec_L(2i-1, 2j) + 4 \cdot rec_L(2i, 2j) + \\ rec_L(2i+1, 2j) + rec_L(2i, 2j+1) + 4 \end{bmatrix} >> 3 \qquad \text{[Equation 5]}$$

If the boundary of the current luma block matches the CTU boundary, only one luma reference line may be used to generate down-sampled luma samples.

The derivation of the parameters may be performed as part of the image decoding process, and may not be performed solely through an encoder search operation. As a result, syntax may not be used to transmit $\alpha$ and/or $\beta$ values to the image decoding apparatus.

According to the present disclosure, a total of eight intra prediction modes may be used in the intra chroma prediction mode encoding process. The eight intra prediction modes may include five existing intra prediction modes and three CCLM modes (CCLM, LM_A and LM_L). The intra chroma prediction mode signaling and derivation process will be described later with reference to Tables 4 and 5 below.

TABLE 4

| intra_chroma_pred_mode[ xCb ][ yCb ] | lumaIntraPredMode | | | | |
| --- | --- | --- | --- | --- | --- |
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

TABLE 5

| intra_chroma_pred_mode[ xCb ][ yCb ] | lumaIntraPredMode | | | | |
| --- | --- | --- | --- | --- | --- |
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

Intra chroma prediction mode encoding may be dependent on the intra prediction mode of the luma block corresponding thereto. In the I slice, since separate block division structures for luma and chroma components are activated, one chroma block may correspond to multiple luma blocks. Therefore, in the case of chroma DM mode, the intra prediction mode of the corresponding luma block covering the center position of the current chroma block may be directly applied.

Table 4 shows a matching table for deriving an intra chroma prediction mode when CCLM is not applicable, and Table 5 shows a mapping table for deriving an intra chroma prediction mode when CCLM is applicable. As shown in the table, the intra chroma prediction mode may be determined based on the value of information on the intra luma prediction mode for a luma block (e.g., when DUAL_TREE is applied) covering the bottom-right center sample of the chroma block or the current block and the signaled intra chroma prediction mode (intra_chroma pred_mode). The indices of IntraPredModeC[xCb][yCb] derived from the above-mentioned tables may correspond to the indices of the intra prediction mode disclosed in Table 1 above.

Overview of Multi-Model LM (MMLM)

CCLM mode may be extended to MMLM mode. For example, three MMLM modes may be added. Neighboring samples reconstructed in each MMLM mode may be classified into two groups using a threshold. The threshold may be, for example, an average value of reconstructed luma samples. The linear model for each group may be derived using a Linear-Mean-Square (LMS) method. Even in CCLM mode, the LMS method may be used to derive a linear model.

When MMLM is used, there may be two or more linear models between luma samples and chroma samples in a CU. In this method, the neighboring luma samples and neighboring chroma samples of the current block may be classified into several groups. Additionally, each group may be used as a training set to derive a linear model. That is, CCLM parameters (e.g., $\alpha$ and/or $\beta$) may be derived for each group. Additionally, samples within the current luma block may be classified using the same method as the method for classifying neighboring luma samples.

In this method, neighboring samples may be classified into M groups. Here, M may be 2 or 3. When M is 2 or 3, the MMLM method may be designed with two additional chroma prediction modes, called MMLM2 and MMLM3, in addition to the original LM mode. The image encoding apparatus may select an optimal mode in the RDO process and signal that mode.

Figures 10, 11:
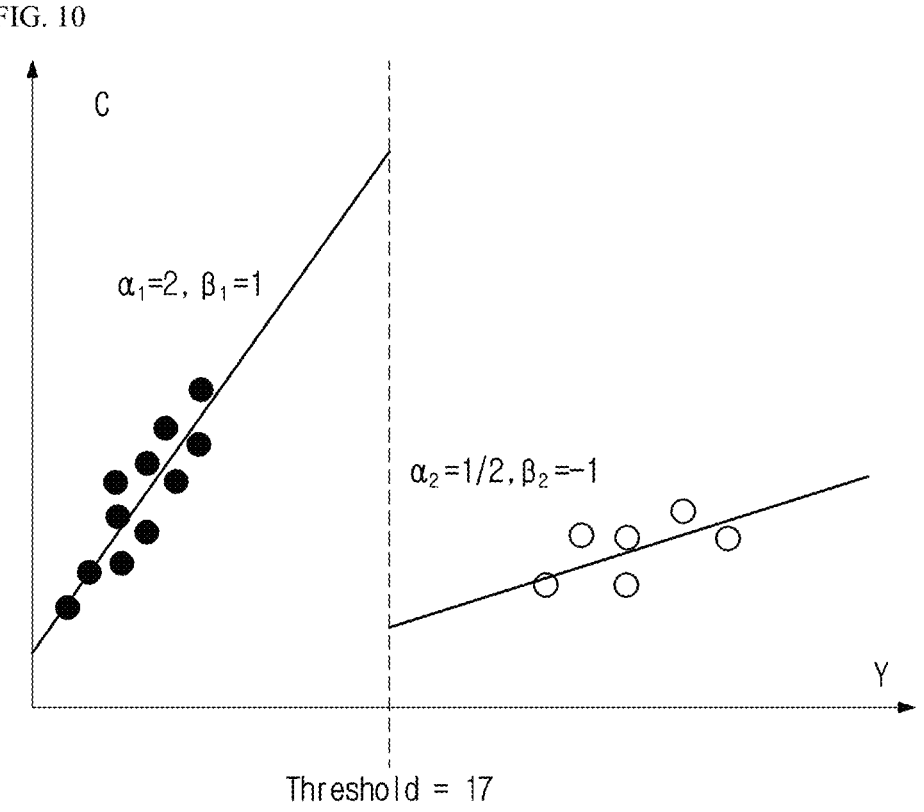
FIG. 10 is a diagram illustrating an example of classifying neighboring samples into two groups in order to derive multi-model linear model (MMLM) parameters according to an embodiment of the present disclosure.
FIG. 11 is a diagram for explaining a reference sample selection method for deriving CCLM parameters according to an embodiment of the present disclosure.

FIG. 10 is a diagram illustrating a method of classifying neighboring samples into two groups according to an embodiment of the present disclosure. FIG. 10 shows the case where M is 2. Referring to FIG. 10, the threshold may be calculated as an average value of reconstructed neighboring luma samples. Neighboring luma samples with $Rec'_L$ [x,y] equal to or less than the threshold may be classified into group 1, and neighboring luma samples exceeding the threshold may be classified into group 2. The two models of Group 1 and Group 2 may be derived using Equation 6 below.

$$\begin{cases} Pred_C[x, y] = \alpha_1 \times Rec'_L[x, y] + \beta_1 & \text{if } Rec'_L[x, y] \le \text{Threshold} \\ Pred_C[x, y] = \alpha_2 \times Rec'_L[x, y] + \beta_2 & \text{if } Rec'_L[x, y] > \text{Threshold} \end{cases}$$ [Equation 6]

Hereinafter, an image encoding/decoding method according to an embodiment of the present disclosure will be described in detail.

The present disclosure relates to a CCLM method, and, more particularly, to a multi-reference line-based CCLM method. The CCLM mode according to the present disclosure may include an LM mode using a neighboring upper reference sample and a left reference sample, an LM_L mode using only a left reference sample, an LM_A mode using only an upper reference sample, multi-model (MM) LM-based 3 LM modes using two or more linear model parameters (MMLM mode (using the upper reference sample and the left reference sample), MMLM_L mode (using only the left reference sample), and MMLM_A mode (using only the upper reference sample)). In the present disclosure, the above six LM methods are collectively referred to as CCLM methods. Additionally, the 'reference line' mentioned in the present disclosure may be referred to as a 'reference sample line' or another term with an equivalent technical meaning.

The present disclosure proposes a method of using more neighboring reference samples than when using one reference line, when generating a prediction block of a chroma image through the CCLM method. The existing CCLM method derives linear model parameters (hereinafter referred to as 'CCLM parameters') a and B values using one reference line around the chroma block. CCLM parameters may be derived through a linear model derived using four neighboring reference samples as described above. Alternatively, CCLM parameters may be derived through a linear mean-square (LMS) model. For example, Equation 7 may be an example of deriving CCLM parameters using an LMS model.

$$\alpha = \frac{I \times \sum_{i=0}^{I} Rec_C(i) \times Rec'_L(i) - \sum_{i=0}^{I} Rec_C(i) \times \sum_{i=0}^{I} Rec'_L(i)}{I \times \sum_{i=0}^{I} Rec'_L(i) \times Rec'_L(i) - \left(\sum_{i=0}^{I} Rec'_L(i)\right)^2} = \frac{A_1}{A_2}$$

[Equation 7]

$$\beta = \frac{\sum_{i=0}^{I} Rec_C(i) - \alpha \times \sum_{i=0}^{I} Rec'_L(i)}{I}$$

Here, $Rec_C(i)$ represents reconstructed chroma samples around a target block (current chroma block), and $Rec'_L(i)$ represents down-sampled luma samples around a target block (current luma block). Additionally, I represents the total number of samples.

As described above, when using one reference line around the current chroma block to derive CCLM parameters, it is not easy to derive a sophisticated linear model, so prediction accuracy may deteriorate and, as a result, image coding efficiency may deteriorate.

For example, according to the present disclosure, a more sophisticated linear model may be derived by using two or more reference lines around the current chroma block to derive CCLM parameters. As a result, prediction accuracy can be improved and, as a result, image encoding efficiency can be improved.

According to one embodiment of the present disclosure, two or more neighboring reference lines may be used for LMS-based CCLM parameter derivation. According to an embodiment of the present disclosure, when deriving LMS-based CCLM parameters, the accuracy of CCLM prediction can be increased by deriving the CCLM parameters using two or more neighboring reference lines of the current chroma block.

FIG. 11 is a diagram for explaining a reference sample selection method for deriving CCLM parameters according to an embodiment of the present disclosure.

Specifically, FIG. 11 shows an example of a method of selecting neighboring reference samples when deriving CCLM parameters using two neighboring reference lines of a 4×4 current chroma block. According to an embodiment of the present disclosure shown in FIG. 11, 8 chroma samples of a second reference line may be used to derive CCLM parameters, in addition to 8 chroma samples of a first reference line. At this time, down-sampling of neighboring reference samples of the corresponding luma block is performed. For example, a first down-sampled upper reference line may be obtained by down-sampling the first upper reference line and second upper reference line of the luma block. In addition, a second down-sampled upper reference line may be obtained by down-sampling the third upper reference line and the fourth upper reference line. In this way, two down-sampled upper reference lines may be generated. Additionally, according to an embodiment of the present disclosure, the first down-sampled left reference line may be obtained by down-sampling the first, second and third left reference lines of the luma block. Additionally, the second down-sampled left reference line may be obtained by down-sampling the third, fourth, and fifth left reference lines. Accordingly, two down-sampled left reference lines may be generated. The down-sampling equation of the luma sample may use the existing method without change. Alternatively, down sampling of the luma sample may be performed using a method different from the existing method. The above-described method may be equally applied to all CCLM methods (LM, LM_A, LM_L, MMLM, MMLM_A, MMLM_L).

The embodiment described with reference to FIG. 11 is an example performed when the number of chroma reference lines is two. However, the above embodiment may be similarly applied even when the number of chroma reference lines is N. For example, when the number of chroma reference lines is N, a plurality of 2N upper luma reference lines may be used to derive CCLM parameters. At this time, the down-sampled i-th upper luma reference line may be generated based on the (2i−1)-th upper luma reference line and the 2i-th upper luma reference line among the plurality of 2N upper luma reference lines. Here, i may be an integer between 1 and N. CCLM parameters may be derived based on N down-sampled upper luma reference lines generated using this method. Additionally, when the number of chroma reference lines is N, a plurality of 2N+1 left luma reference lines may be used to derive CCLM parameters. At this time, the down-sampled i-th left luma reference line may be generated based on the (2i−1)-th left luma reference line, the 2i-th left luma reference line, and the (2i+1)-th left luma reference line among the plurality of 2N+1 left luma reference lines. CCLM parameters may be derived based on N down-sampled left luma reference lines generated using this method. In this way, when deriving CCLM parameters using reference samples of two (or N) down-sampled reference lines obtained through down-sampling, CCLM prediction performance can be improved by improving parameter accuracy. Additionally, because the number of chroma samples and luma samples for deriving CCLM parameters is increased by two times (or N times), the existing process for deriving CCLM parameters may be used without modification.

Figure 12:
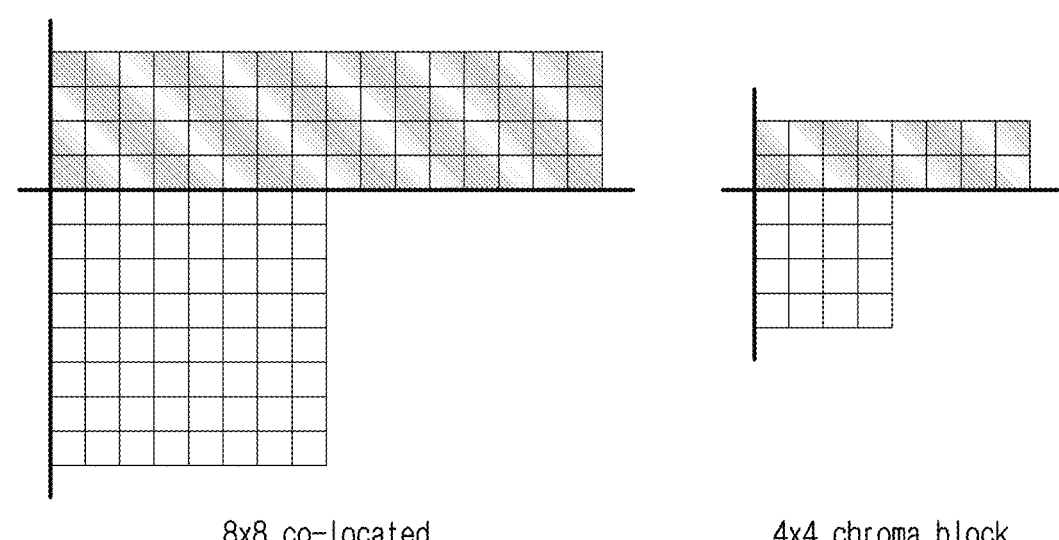
FIG. 12 is a diagram illustrating a reference sample selection method for deriving CCLM parameters in LM_A mode according to an embodiment of the present disclosure.

FIG. 12 is a diagram illustrating a reference sample selection method for deriving CCLM parameters in LM_A mode according to an embodiment of the present disclosure. LM_A mode may be a method of deriving CCLM parameters using only upper reference samples of a current chroma block. To derive CCLM parameters, 8 chroma samples of a second reference line may be used in addition to the existing 8 chroma samples of a first reference line. At this time, the eight chroma samples of the first upper reference line may be samples that exist within the range of the W+H position. Additionally, the image decoding apparatus may down-sample reference samples around the corresponding luma block to derive CCLM parameters. For example, a first down-sampled upper reference line may be obtained by down-sampling the first upper reference line and second upper reference line of the luma block. In addition, a second down-sampled upper reference line may be obtained by down-sampling the third upper reference line and the fourth upper reference line.

Figure 13:
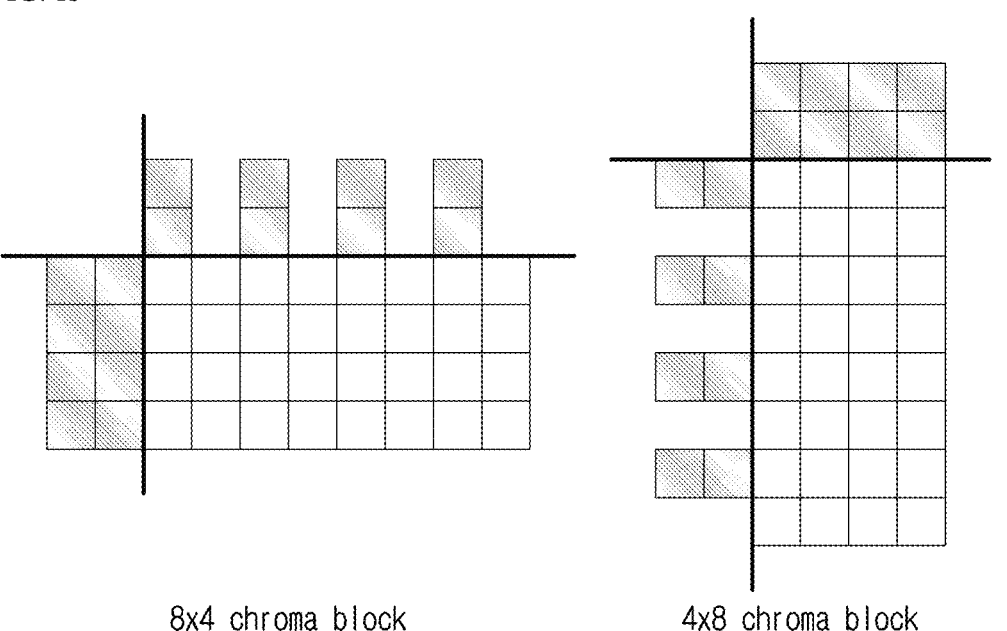
FIG. 13 is a diagram showing an example of a method of selecting reference samples from a non-square block according to an embodiment of the present disclosure.

FIGS. 13 and 14 show an example of a method of selecting reference samples from a non-square block according to an embodiment of the present disclosure. As shown in FIG. 13, for either the left or the top (e.g., long side) of the non-square chroma block, only some of the neighboring reference samples may be selected and used to derive CCLM parameters. At this time, when two reference lines around the current chroma block are used, for example, as shown in the left drawing of FIG. 13, subsampling in the first upper reference line and subsampling in the second upper reference line may be the same. Alternatively, as shown in the right drawing of FIG. 13, subsampling in the first left reference line and subsampling in the second left reference line may be the same. For the corresponding luma block, down-sampling may be performed based on the subsampled position to derive a corresponding reconstructed luma sample.

Figure 14A:
FIG. 14*a* is a diagram showing an example of a method of selecting reference samples from a non-square block according to another embodiment of the present disclosure.

Referring to FIG. 14*a*, for the top of the non-square chroma block, only some of the neighboring reference samples may be selected and used to derive CCLM parameters. At this time, when two reference lines around the current chroma block are used, for example, as shown in FIG. 14*a*, subsampling in the first upper reference line and subsampling in the second upper reference line may be the same. Specifically, the sample present in the second reference line may be selected at the same position as a multiple of the subsampling rate of the sample present in the first reference line. For example, if the subsampling rate is 4, reference samples at positions 0, 4, 8, and 12 may be selected as second reference line samples.

Figure 14B:
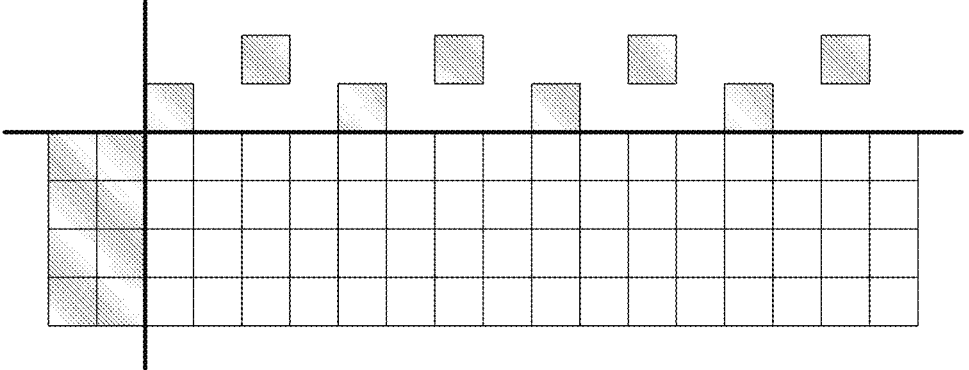
FIG. 14*b* is a diagram showing an example of a method of selecting reference samples from a non-square block according to another embodiment of the present disclosure.

According to another embodiment of the present disclosure, for the top of the non-square chroma block, only some of the neighboring reference samples may be selected and used to derive CCLM parameters. At this time, when two reference lines around the current chroma block are used, for example, as shown in FIG. 14*b*, subsampling in the first upper reference line and subsampling in the second upper reference line may be different. That is, in subsampling of samples present in the first reference line, reference samples at positions shifted by half the subsampling rate, rather than the positions that are multiples of the subsampling rate, may be selected as second reference line samples. For example, if the subsampling rate is 4, reference samples at positions 2, 5, 10, and 14 may be selected as samples of the second reference line.

The embodiment described with reference to FIG. 14 is an example in which subsampling is performed on the upper reference line. However, the above embodiment may be similarly applied even when subsampling is performed in the left reference line. That is, subsampling in the first left reference line and subsampling in the second left reference line may be the same or different.

In applying the CCLM prediction method according to an embodiment of the present disclosure, the CCLM mode may be applied differently to the current chroma block based on whether the top boundary of the current chroma block matches the CTU boundary. According to one embodiment of the present disclosure, if the top boundary of the current chroma block matches the boundary of the CTU, the first (upper) reference line sample is copied to the second reference line, and CCLM parameters according to the present disclosure may be derived using the first and second reference lines.

According to another embodiment of the present disclosure, if the top boundary of the current chroma block matches the boundary of the CTU, the CCLM prediction method according to the present disclosure may not be used. That is, if the top boundary of the current chroma block matches the boundary of the CTU, the CCLM parameters may be derived using one (upper) reference line.

According to another embodiment of the present disclosure, when the top boundary of the current chroma block matches the CTU boundary and the CCLM prediction method using the upper reference line is applied (e.g., LM, LM_A, MMLM, MMLM_A), the CCLM prediction method proposed in the present disclosure may not be used.

According to an embodiment of the present disclosure, during LMS-based CCLM parameter derivation, more reference samples may be used than in the case of one line-based CCLM parameter derivation. By deriving the CCLM parameters using more reference samples than in the case of one line-based CCLM parameter derivation, the accuracy of the CCLM parameters can be increased.

In the above-described embodiments, CCLM parameters are derived based on two reference lines, but the present disclosure is not limited thereto. For example, when deriving CCLM parameters, reference lines around the four current chroma blocks may be used. Alternatively, when deriving CCLM parameters, N reference lines around the current chroma block may be used. At this time, N may have a value between 2 and the CTU size. The two reference line-based CCLM parameter derivation method described above may be applied to the N reference line-based CCLM parameter derivation method. For example, when deriving CCLM parameters using N reference lines, samples required for deriving CCLM parameters from N reference lines may be selected using the same method as the two reference line-based CCLM parameter derivation method described above.

According to another embodiment of the present disclosure, CCLM parameters may be derived based on a predetermined number of reference samples. For example, as described above, CCLM parameters may be derived based on four reference samples. The present disclosure provides various embodiments for deriving CCLM parameters based on more reference samples. For example, as shown in FIG. 13, CCLM parameters may be derived using reference samples selected from two or more reference lines located around the current chroma block. According to the present embodiment, the accuracy of CCLM parameters may be increased by using more reference lines than in the case of one reference line-based CCLM prediction.

For example, according to one embodiment of the present disclosure, the CCLM parameters ($\alpha$ and/or $\beta$) may be derived using up to eight adjacent chroma samples and the down-sampled luma samples corresponding thereto. Alternatively, the CCLM parameters ($\alpha$ and/or $\beta$) may be derived using N adjacent chroma samples and down-sampled luma samples corresponding thereto. If the size of the current block is W×H, W' and H' may be derived as follows. W' may refer to the range where upper neighboring chroma samples used to derive CCLM parameters are located. H' may refer to the range where the left neighboring chroma samples used to derive CCLM parameters are located.

When applying LM mode or MMLM mode, W'=W, H'=H

When applying LM_A mode or MMLM_A mode, W'=W+H

When applying LM_L mode or MMLM_L mode, H'=H+W

The positions of the upper neighboring samples may be expressed as S[0, −1] . . . . S[W''−1,−1]. Additionally, the positions of the left neighboring samples may be expressed as S[−1, 0] . . . S[−1, H'−1]. In this case, four samples in the first reference line required to derive CCLM parameters may be selected as follows.

If LM mode or MMLM mode is applied and both upper neighboring samples and left neighboring samples are available, S[W'/4, −1], S[3W'/4, −1], S[−1, H'/4], S[−1, 3H/4]

If LM_A mode or MMLM_A mode is applied, or only upper neighboring samples are available, S[W/8, −1], S[3W/8, −1], S[5W/8, −1], S[7W/8,−1]

If LM_L mode or MMLM_L mode is applied, or only left neighboring samples are available, S[−1, H'/8], S[−1, 3H/8], S[−1, 5H/8], S[−1, 7H/8]

Meanwhile, the positions of neighboring samples located on the second upper reference line may be expressed as S2[0, −1] . . . S2[W"−1, −1]. Additionally, the positions of neighboring samples located on the second left reference line may be expressed as S2[−1, 0] . . . S2[−1, H'−1]. In this case, additional four samples required to derive CCLM parameters may be selected as follows.

If LM mode or MMLM mode is applied and both upper neighboring samples and left neighboring samples are available, S2[W/4,−1], S2[3W/4,−1], S2[−1, H'/4], S2[−1, 3H/4]

If LM_A mode or MMLM_A mode is applied, or only upper neighboring samples are available, S2[W/8,−1], S2[3W/8,−1], S2[5W/8,−1], S2[7W/8,−1]

If LM_L mode or MMLM_L mode is applied, or only left neighboring samples are available, S2[−1, H'/8], S2[−1, 3H/8], S2[−1, 5H/8], S2[−1, 7H'/8]

After eight reference sample pairs for CCLM parameter derivation are selected through the above-described method, CCLM parameters may be derived by extending the existing CCLM parameter derivation method. For example, eight reference samples may be divided into two types by comparing the sizes of the sample values, and then CCLM parameters may be derived based on the average value of each group. For example, CCLM parameters may be derived using Equation 3 described above. That is, the average of the luma sample values of each group may correspond to Xa and Xb in Equation 3 above, and Ya and Yb may also be derived as the average of the chroma sample values of each group.

According to another embodiment of the present disclosure, in applying the CCLM prediction method, if the top boundary of the current chroma block matches the boundary of the CTU, the samples present in the first reference line are copied to the second reference line and then the CCLM prediction method according to the present disclosure may be used. According to another embodiment of the present disclosure, if the top boundary of the current chroma block matches the boundary of the CTU, the CCLM prediction method according to the present disclosure may not be used. According to another embodiment of the present disclosure, when the top boundary of the current chroma block matches the boundary of the CTU and the CCLM prediction method using the upper reference line is applied (e.g., LM, LM_A, MMLM, MMLM_A), the CCLM prediction method proposed in the present disclosure may not be used.

According to another embodiment of the present disclosure, during LMS-based CCLM parameter derivation, more reference samples may be used than in the case of deriving CCLM parameters based on one reference line. The accuracy of the CCLM parameters can be increased by deriving the CCLM parameters using more reference samples than when deriving the CCLM parameters based on one reference line. According to an embodiment of the present disclosure, when deriving CCLM parameters, four reference lines around the chroma block may be used. For example, in this case, the CCLM parameters may be derived using Equation 7 described above. Alternatively, N reference lines around the chroma block may be used when deriving CCLM parameters. At this time, N may have a value between 2 and the CTU size. The two reference line-based CCLM parameter derivation method described above may be applied to the N reference line-based CCLM parameter derivation method. For example, when deriving CCLM parameters using N reference lines, samples required to derive CCLM parameters from N reference lines may be selected using the same method as the two reference line-based CCLM parameter derivation method.

According to another embodiment of the present disclosure, a multi-reference line-based CCLM method may be applied adaptively to the size of the current chroma block. That is, the number of chroma reference lines used to derive CCLM parameters may be determined differently based on comparison between the size of the chroma block and a predetermined threshold. Specific examples are as follows:

If the width x height of the chroma block is more than N, the multi-reference line-based CCLM method is applied. In other cases, the existing 1 reference line-based CCLM method is applied. N∈{4,8,16,32,64,128, 256,1024}

If the width of the chroma block is more than N, the multi-reference line-based LM, LM_A, MMLM, and MMLM_A methods are applied. In other cases, the existing 1 reference line-based LM, LM_A, MMLM, MMLM_A methods are applied. N∈{2, 4,8,16,32,64, 128}

If the height of the chroma block is more than N, the multi-reference line-based LM, LM_L, MMLM, and MMLM_L methods are applied. In other cases, the existing 1 reference line-based LM, LM_L, MMLM, MMLM_L methods are applied. N∈{2, 4,8,16,32,64, 128}

If the width x height of the chroma block is less than N, the multi-reference line-based CCLM method is applied. In other cases, the existing 1 reference line based CCLM method is applied. ∈{4,8,16,32,64,128, 256,1024}

If the width of the chroma block is less than N, the multi-reference line-based LM, LM_A, MMLM, and MMLM_A methods are applied. In other cases, the existing 1 reference line-based LM, LM_A, MMLM, MMLM_A methods are applied. N∈{2, 4,8,16,32,64, 128}

If the height of the chroma block is less than N, the multi-reference line-based LM, LM_L, MMLM, and MMLM_L methods are applied. In other cases, the existing 1 reference line-based LM, LM_L, MMLM, MMLM_L methods are applied. N∈{2, 4,8,16,32,64, 128}

Through the above-described method, when there are many or few reference samples for prediction of the current chroma block, the efficiency of CCLM prediction can be maximized by adaptively selecting the number of reference lines.

According to another embodiment of the present disclosure, whether to apply the multi-reference line-based CCLM method may be determined adaptively to the CCLM type. Based on the CCLM type (LM, LM_A, LM_L, MMLM, MMLM_A, MMLM_L), whether to apply the multi-reference line-based CCLM method may be determined as follows.

in the case of at least one of MMLM, MMLM_A or MMLM_L, apply multi-reference line-based CCLM method in the case of at least one of LM, LM_A or LM_L, apply multi-reference line-based CCLM method in the case of at least one of LM or MMLM, apply multi-reference line-based CCLM method in the case of at least one of LM_A, MMLM_A, LM_L or MMLM_L, apply multi-reference line-based CCLM method in the case of at least one of LM_A or MMLM_A, apply multi-reference line-based CCLM method in the case of at least one of LM_L or MMLM_L, apply multi-reference line-based CCLM method Hereinafter, embodiments described with reference to FIGS. 15 to 18 may be performed in an image encoding apparatus or an image decoding apparatus. For example, the method shown in FIGS. 15 to 18 may be performed in the intra prediction unit 185 of the image encoding apparatus 100 of FIG. 2 or the intra prediction unit 265 of the image decoding apparatus 200 of FIG. 3. When performed in the image encoding apparatus 100, the method shown in FIGS. 15 to 18 may be performed in step S410 of FIG. 4. When performed in the image decoding apparatus 200, the method shown in FIGS. 15 to 18 may be performed in steps S610 to S630 of FIG. 6. Hereinafter, for convenience of explanation, the method shown in FIGS. 15 to 18 will be described as being performed in an image decoding apparatus. However, the method shown in FIGS. 15 to 18 may be equally performed in an image encoding apparatus.

Figures 15, 16:
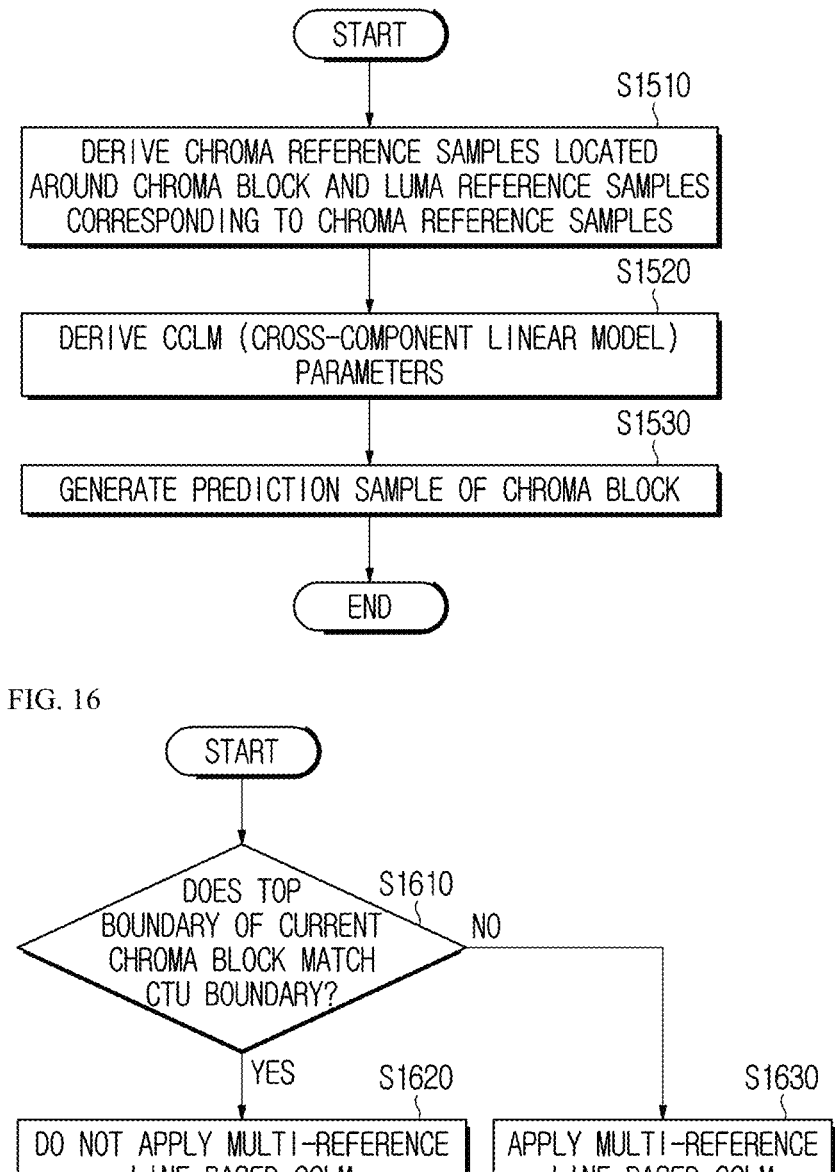
FIG. 15 is a flowchart illustrating a CCLM prediction mode according to an embodiment of the present disclosure.
FIG. 16 shows examples of a method of applying CCLM when the top boundary of a current chroma block matches a CTU boundary.

FIG. 15 is a flowchart showing a CCLM prediction method according to an embodiment of the present disclosure.

Referring to FIG. 15, the image decoding apparatus may derive chroma reference samples located around a chroma block and luma reference samples corresponding to the chroma reference samples (S1510). The chroma reference samples located around the chroma block may be reference samples adjacent to the chroma block. Additionally, the luma reference samples corresponding to the chroma reference samples may be reference samples adjacent to a luma block. At this time, according to an embodiment of the present disclosure, the chroma reference samples may be obtained from two or more chroma reference lines adjacent to the chroma block. At least one or a combination of two or more of the various embodiments of the present disclosure may be applied to derive the reference samples in step S1510.

The image decoding apparatus may derive CCLM parameters based on the chroma reference samples and the luma reference samples (S1520). That is, the CCLM parameters may be derived using the chroma reference samples and luma reference samples derived in step S1510. According to an embodiment of the present disclosure, the CCLM parameters may be derived using the chroma reference samples and luma reference samples derived in step S1510. In this case, the CCLM parameters may be derived using the LMS model. For example, the CCLM parameters may be derived using Equation 7 described above. According to another embodiment of the present disclosure, the CCLM parameters may be derived using only a predetermined number of the chroma reference samples and luma reference samples derived in step S1510. For example, the CCLM parameters may be derived using Equation 2 and/or Equation 3 described above.

The image decoding apparatus may generate a prediction sample of a current chroma block based on the CCLM parameters (S1530). Specifically, the prediction sample of the current chroma block may be derived using the CCLM parameters derived in step S1520 and the reconstructed sample of the current luma block. Alternatively, the prediction sample of the current chroma block may be derived using the CCLM parameters derived in step S1520 and the down-sampled reconstructed sample of the current luma block. According to an embodiment of the present disclosure, the prediction sample of the chroma block may be derived using Equation 1 described above.

According to the method shown in FIG. 15, two or more reference lines may be used to derive CCLM parameters, allowing more precise derivation of CCLM parameters. Additionally, it is possible to improve the accuracy of CCLM prediction and improve coding efficiency.

FIG. 16 shows examples of a method of applying CCLM when the top boundary of a current chroma block matches a CTU boundary.

The method of FIG. 16 may be performed as a previous step of step S1510 of FIG. 15. That is, the method of FIG. 16 may be a method of determining whether to use a plurality of reference lines, a single reference line, or another modified reference line to derive the CCLM parameters.

Referring to FIG. 16, the image decoding apparatus check whether the top boundary of the current chroma block matches the CTU boundary (S1610). If the top boundary of the chroma block matches the CTU boundary (YES in S1610), the image decoding apparatus may not apply multi-reference line-based CCLM (S1620). In this case, for example, the image decoding apparatus may apply one reference line-based CCLM. Alternatively, the image decoding apparatus may copy samples present in a first reference line to a second reference line and then apply the multi-reference line-based CCLM according to the present disclosure.

If the top boundary of the chroma block does not match the boundary of the CTU (NO in S1610), the image decoding apparatus may apply multi-reference line-based CCLM according to the present disclosure to predict the current chroma block (S1630). For example, if the top boundary of the chroma block does not match the CTU boundary, the image decoding apparatus may derive CCLM parameters using an LMS model based on multiple reference lines or using a predetermined number of reference samples selected from the multiple reference lines.

According to the embodiment shown in FIG. 16, since various embodiments according to the present disclosure can be adaptively applied depending on whether the top boundary of the chroma block matches the CTU boundary, the efficiency of CCLM parameter derivation can be improved.

Figure 17:
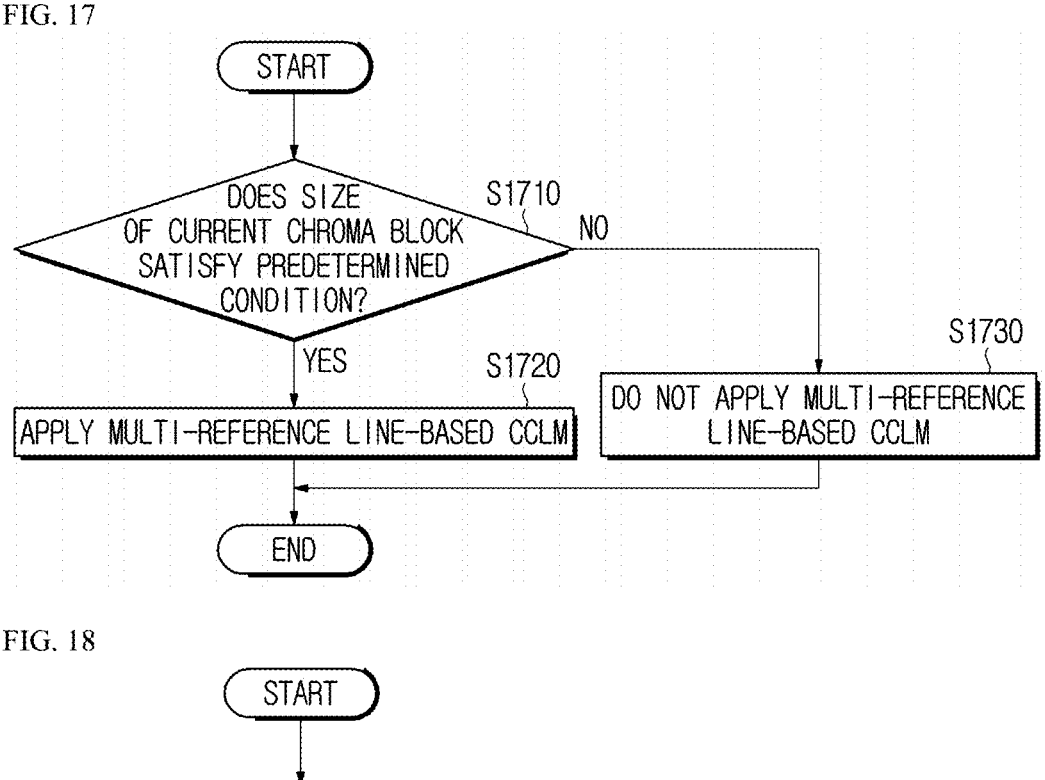
FIG. 17 is a diagram for explaining embodiments of the present disclosure that determine whether to apply multi-reference line-based CCLM based on the size of a current chroma block.

FIG. 17 is a diagram for explaining embodiments of the present disclosure that determine whether to apply multi-reference line-based CCLM based on the size of a current chroma block.

Referring to FIG. 17, the image decoding apparatus may check whether the size of the current chroma block satisfies a predetermined condition (S1710). According to an embodiment of the present disclosure, the predetermined condition may be a condition for checking whether the width x height of the current chroma block is N or more. Here, N may be at least one of 4, 8, 16, 32, 64, 128, 256, or 1024, and may include other numbers. According to another embodiment of the present disclosure, the predetermined condition may be a condition for checking whether the width of the current chroma block is N or more. Here, N may be at least one of 2, 4, 8, 16, 32, 64, or 128, and may include other numbers. According to another embodiment of the present disclosure, the predetermined condition may be a condition for checking whether the height of the current chroma block is N or more. Here, N may be at least one of 2, 4, 8, 16, 32, 64, or 128, and may include other numbers. According to another embodiment of the present disclosure, the predetermined condition may be a condition for checking whether the width x height of the current chroma block is N or less. Here, N may be at least one of 4, 8, 16, 32, 64, 128, 256, or 1024, and may include other numbers. According to another embodiment of the present disclosure, the predetermined condition may be a condition for checking whether the width of the current chroma block is N or less. Here, N may be at least one of 2, 4, 8, 16, 32, 64, or 128, and may include other numbers. According to another embodiment of the present disclosure, the predetermined condition may be a condition for checking whether the height of the current chroma block is N or less. Here, N may be at least one of 2, 4, 8, 16, 32, 64, or 128, and may include other numbers.

If the size of the current chroma block satisfies the predetermined condition (YES in S1710), multi-reference line-based CCLM may be applied (S1720). For example, when the size of the current chroma block satisfies the predetermined condition, the image decoding apparatus may derive CCLM parameters using an LMS model based on multiple reference lines or using a predetermined number of reference samples selected from the multiple reference lines. On the other hand, if the size of the current chroma block does not satisfy the predetermined condition (NO in S1710), multi-reference line-based CCLM may not be applied (S1730). In this case, for example, one reference line-based CCLM may be applied.

According to the embodiment shown in FIG. 17, when there are many or few samples for prediction of the current chroma block, the efficiency of CCLM prediction can be improved by adaptively selecting the number of reference lines for deriving CCLM parameters.

Figure 18:
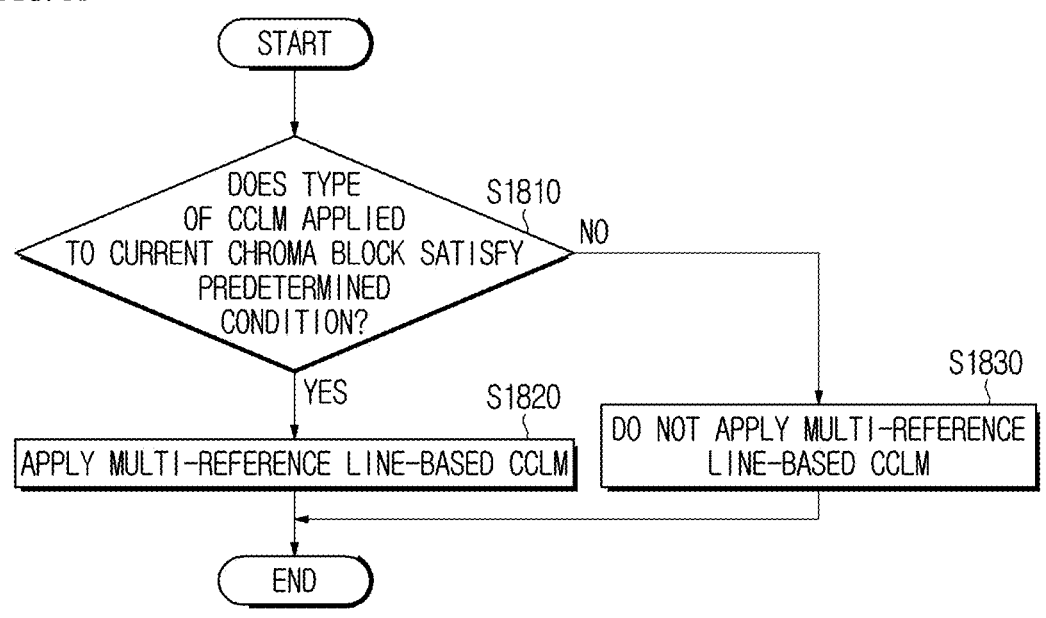
FIG. 18 is a diagram for explaining embodiments of the present disclosure that determine whether to apply CCLM based on the type of CCLM applied to a current chroma block.

FIG. 18 is a diagram for explaining embodiments of the present disclosure that determine whether to apply multi-reference line-based CCLM based on the type of CCLM applied to a current chroma block.

Referring to FIG. 18, the image decoding apparatus may check whether the type of CCLM applied to the current chroma block satisfies a predetermined condition (S1810). According to an embodiment of the present disclosure, the predetermined condition may be a condition for checking whether the CCLM mode applied to the current chroma block is at least one of MMLM, MMLM_A, or MMLM_L, According to another embodiment of the present disclosure, the predetermined condition may be a condition for checking whether the CCLM mode applied to the current chroma block is at least one of LM, LM_A, or LM_L, According to another embodiment of the present disclosure, the predetermined condition may be a condition for checking whether the CCLM mode applied to the current chroma block is at least one of LM or MMLM, According to another embodiment of the present disclosure, the predetermined condition may be a condition for checking whether the CCLM mode applied to the current chroma block is at least one of LM_A, MMLM_A, LM_L, or MMLM_L. According to another embodiment of the present disclosure, the predetermined condition may be a condition for checking whether the CCLM mode applied to the current chroma block is at least one of LM_A or MMLM_A. According to another embodiment of the present disclosure, the predetermined condition may be a condition for checking whether the CCLM mode applied to the current chroma block is at least one of LM_L or MMLM_L.

If the type of CCLM applied to the current chroma block satisfies the predetermined condition (YES in S1810), multi-reference line-based CCLM may be applied (S1820). For example, when the type of CCLM applied to the current chroma block satisfies the predetermined condition, the image decoding apparatus may derive CCLM parameters using an LMS model based on multiple reference lines or using a predetermined number of reference samples selected from the multiple reference lines.

On the other hand, if the type of CCLM applied to the current chroma block does not satisfy the predetermined condition (NO in S1810), the multi-reference line-based CCLM may not be applied (S1830). In this case, for example, one reference line-based CCLM may be applied.

According to the embodiment shown in FIG. 18, since various embodiments according to the present disclosure may be adaptively applied depending on the type of CCLM applied for prediction of the current chroma block, the efficiency of CCLM parameter derivation can be improved. For example, in the case of MMLM, MMLM_A, or MMLM_L, since two or more linear models are derived, a sufficient number of reference samples needed for derivation of the linear model needs to be secured. Therefore, when the CCLM applied to the current chroma block is at least one of MMLM, MMLM_A, or MMLM_L, the accuracy of the multiple linear models can be improved by applying the multi-reference line-based CCLM according to the present disclosure, thereby improving the prediction accuracy.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 19:
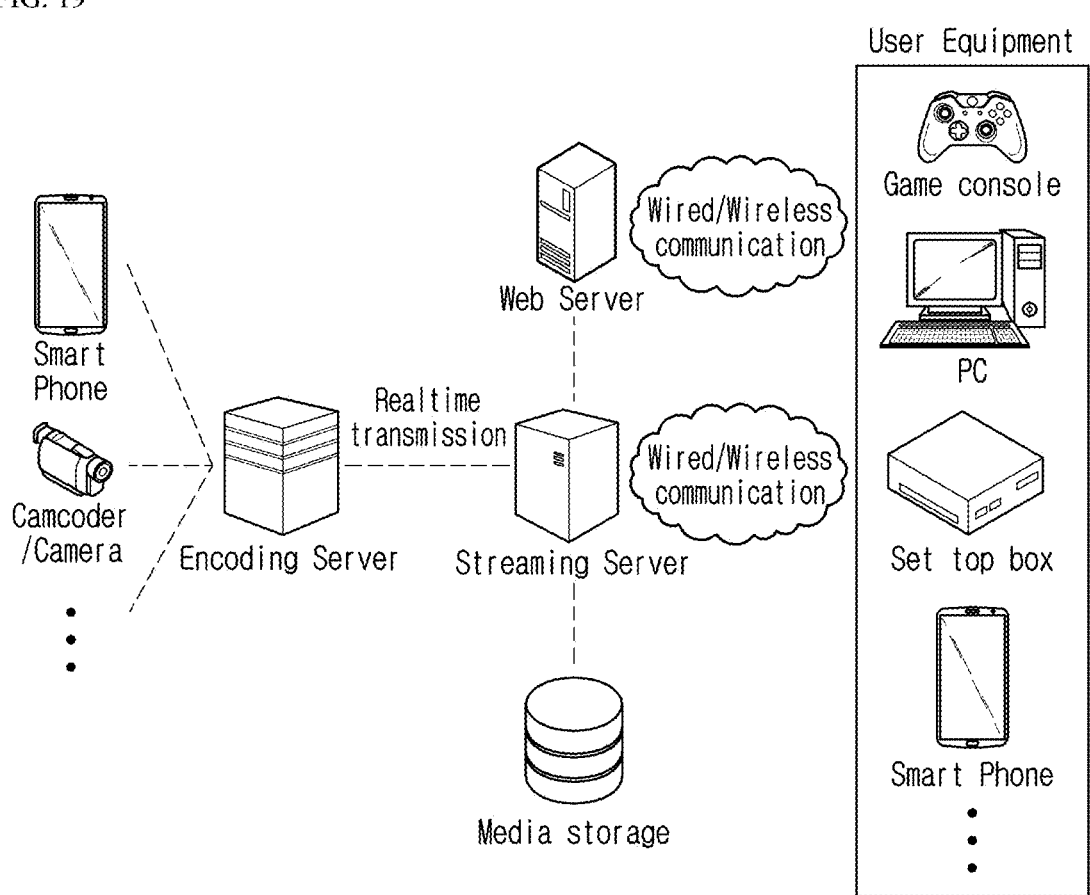
FIG. 19 is a view showing a content streaming system to which an embodiment of the present disclosure is applicable.

FIG. 19 is a view showing a content streaming system, to which an embodiment of the present disclosure is applicable.

As shown in FIG. 19, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:

deriving chroma reference samples located around a chroma block and luma reference samples corresponding to the chroma reference samples based on an intra prediction mode of the chroma block being a cross-component linear model (CCLM) mode;

deriving CCLM parameters based on the chroma reference samples and the luma reference samples; and generating a prediction sample of the chroma block based on the CCLM parameters, wherein the chroma reference samples are obtained from two or more chroma reference lines adjacent to the chroma block, and wherein a number of chroma reference lines used to derive the CCLM parameters is differently determined based on a type of CCLM applied to the chroma block.

2. The image decoding method of claim 1, wherein the deriving the CCLM parameters is performed based on linear-mean-square (LMS) using the chroma reference samples present in the two or more chroma reference lines adjacent to the chroma block.

3. The image decoding method of claim 1, wherein the deriving the CCLM parameters uses a predetermined number of chroma reference samples present in the two or more chroma reference lines adjacent to the chroma block.

4. The image decoding method of claim 1, wherein a subsampling method for a first reference line adjacent to the chroma block and a subsampling method for a second reference line adjacent to the chroma block are same based on the chroma block being a non-square block.

5. The image decoding method of claim 1, wherein a subsampling method for a first reference line adjacent to the chroma block and a subsampling method for a second reference line adjacent to the chroma block are different based on the chroma block being a non-square block.

6. The image decoding method of claim 1, wherein a number of chroma reference lines for deriving the chroma reference samples is differently determined, based on a top boundary of the chroma block matching a CTU boundary.

7. The image decoding method of claim 1, wherein based on a number of two or more chroma reference lines being N, a down-sampled i-th upper luma reference line is generated based on a (2i−1)-th upper luma reference line and a 2i-th upper luma reference line among a plurality of 2N upper luma reference lines, i being an integer between 1 and N, and wherein the luma reference samples are obtained based on the down-sampled N upper luma reference lines.

8. The image decoding method of claim 1, wherein based on a number of two or more chroma reference lines being N, a down-sampled i-th left luma reference line is generated based on a (2i−1)-th left luma reference line, a 2i-th left luma reference line and a (2i+1)-th left luma reference line among a plurality of 2N+1 left luma reference lines, i being an integer between 1 and N, and wherein the luma reference samples are obtained based on the down-sampled N left luma reference lines.

9. The image decoding method of claim 1, wherein a number of chroma reference lines used to derive the CCLM parameters is differently determined based on a comparison between a size of the chroma block and a predetermined threshold.

10. The image decoding method of claim 1, wherein the deriving the CCLM parameters further comprises:

classifying the luma reference samples and the chroma reference samples into two or more groups based on a predetermined threshold; and deriving the CCLM parameters for each classified group.

11. An image encoding method performed by an image encoding apparatus, the image encoding method comprising:

deriving chroma reference samples located around a chroma block and luma reference samples corresponding to the chroma reference samples based on an intra prediction mode of the chroma block being a cross-component linear model (CCLM) mode;

deriving CCLM parameters based on the chroma reference samples and the luma reference samples; and generating a prediction sample of the chroma block based on the CCLM parameters, wherein the chroma reference samples are obtained from two or more chroma reference lines adjacent to the chroma block, and wherein a number of chroma reference lines used to derive the CCLM parameters is differently determined based on a type of CCLM applied to the chroma block.

12. A method of transmitting a bitstream generated by an image encoding method, the image encoding method comprising:

deriving chroma reference samples located around a chroma block and luma reference samples corresponding to the chroma reference samples based on an intra prediction mode of the chroma block being a cross-component linear model (CCLM) mode;

deriving CCLM parameters based on the chroma reference samples and the luma reference samples; and generating a prediction sample of the chroma block based on the CCLM parameters, wherein the chroma reference samples are obtained from two or more chroma reference lines adjacent to the chroma block, and wherein a number of chroma reference lines used to derive the CCLM parameters is differently determined based on a type of CCLM applied to the chroma block.

* * * * *